(12) United States Patent
Curatolo et al.

(10) Patent No.: US 8,746,650 B2
(45) Date of Patent: Jun. 10, 2014

(54) UNIVERSAL PORTABLE DEVICE STAND AND HOLDER APPARATUS

(76) Inventors: Santo R. Curatolo, Palm Beach Gardens, FL (US); Giorgio Curatolo, East Setauket, NY (US)

( * ) Notice: Subject to any disclaimer, the term of this patent is extended or adjusted under 35 U.S.C. 154(b) by 0 days.

(21) Appl. No.: 12/952,016

(22) Filed: Nov. 22, 2010

(65) Prior Publication Data

US 2012/0126087 A1    May 24, 2012

(51) Int. Cl.
*F16M 1/00*    (2006.01)
(52) U.S. Cl.
USPC ................. 248/677; 248/188.8; 248/292.12; 248/919
(58) Field of Classification Search
USPC ........... 248/126, 188.8, 188.6, 206.5, 292.12, 248/299.1, 351, 454, 455, 477, 673, 677, 248/688, 918, 923; 361/679.56; 455/575.1
See application file for complete search history.

(56) References Cited

U.S. PATENT DOCUMENTS

| | | | | |
|---|---|---|---|---|
| 5,141,196 A | * | 8/1992 | Arnold et al. | 248/397 |
| 5,489,055 A | * | 2/1996 | Levy | 224/544 |
| 5,704,581 A | * | 1/1998 | Chen | 248/371 |
| 6,003,831 A | * | 12/1999 | Coleman | 248/688 |
| 6,079,683 A | * | 6/2000 | Lin | 248/292.12 |
| 6,125,566 A | * | 10/2000 | McLaughlin | 40/737 |
| 2005/0263661 A1 | * | 12/2005 | Park | 248/292.12 |

* cited by examiner

*Primary Examiner* — Gwendolyn W Baxter
(74) *Attorney, Agent, or Firm* — The Meola Firm, PLLC

(57) ABSTRACT

An apparatus that securely supports and displays for adjustable viewing of portable electronic devices where the apparatus can be frictionally engaged into any accessible material seam as well as being supportable on flat surfaces.

6 Claims, 36 Drawing Sheets

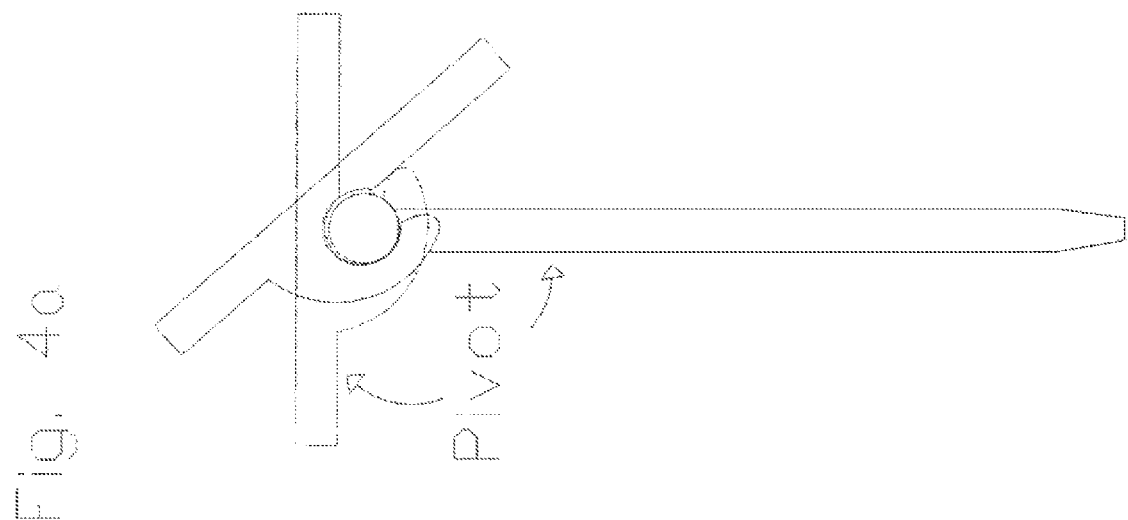

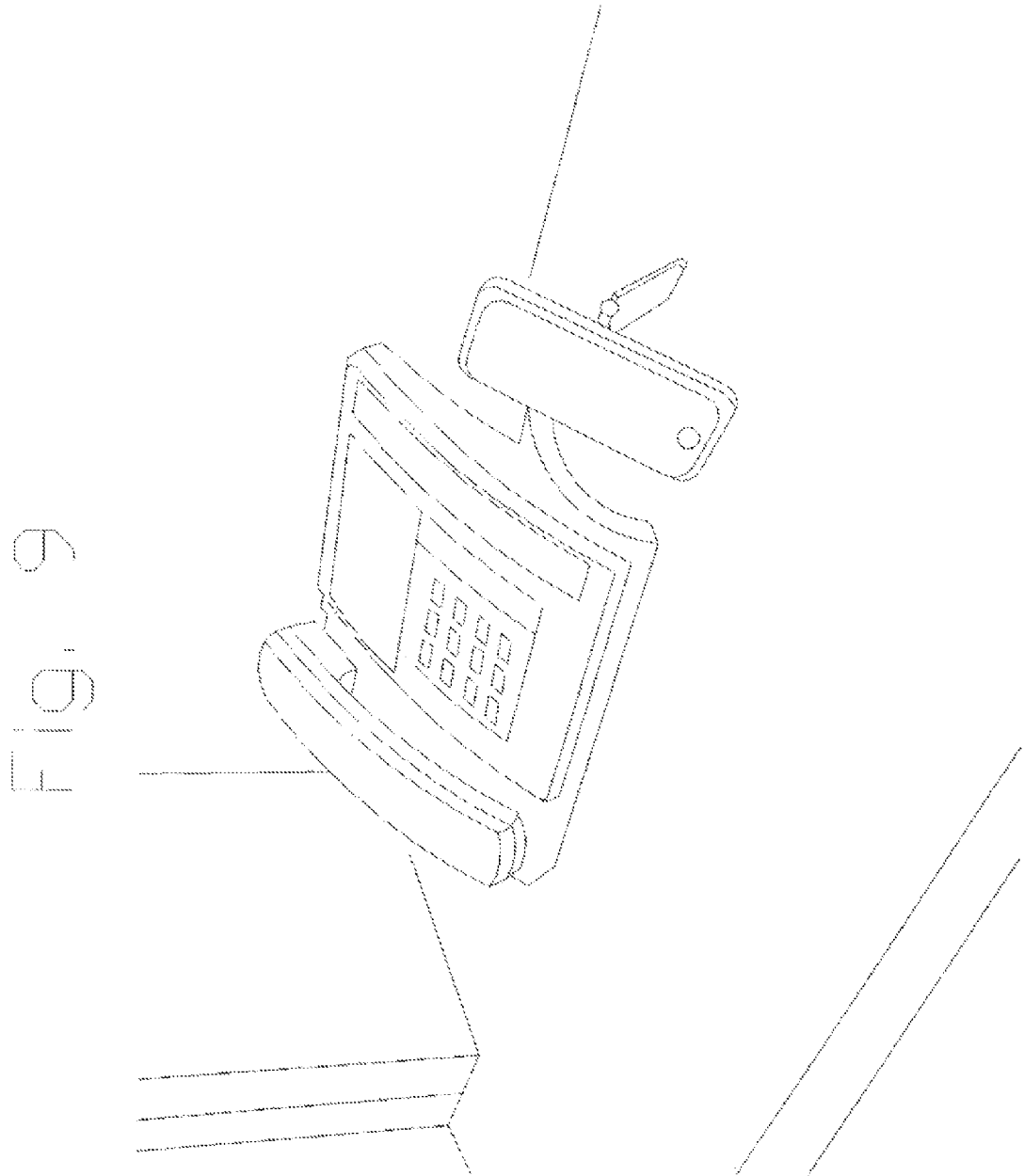

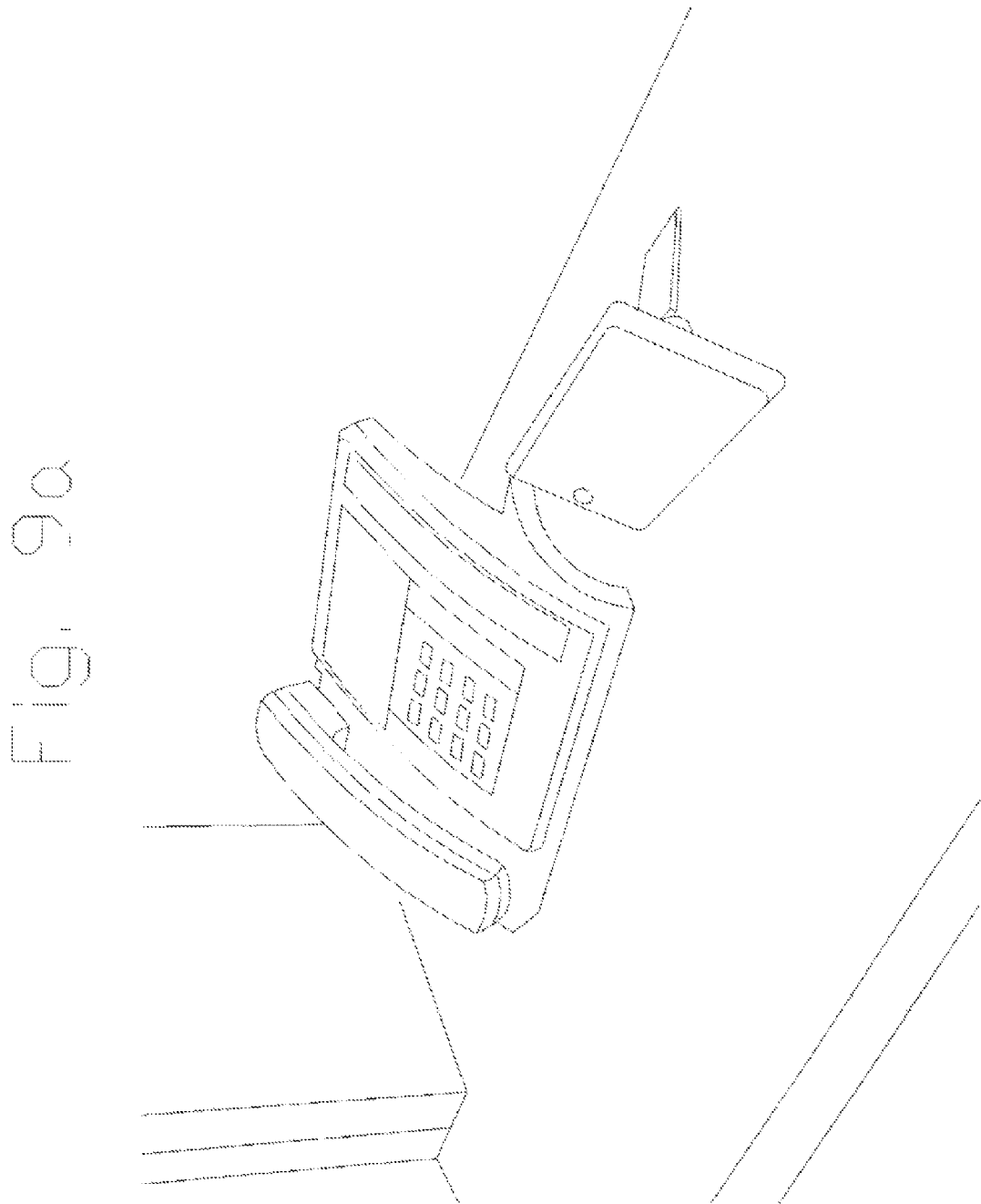

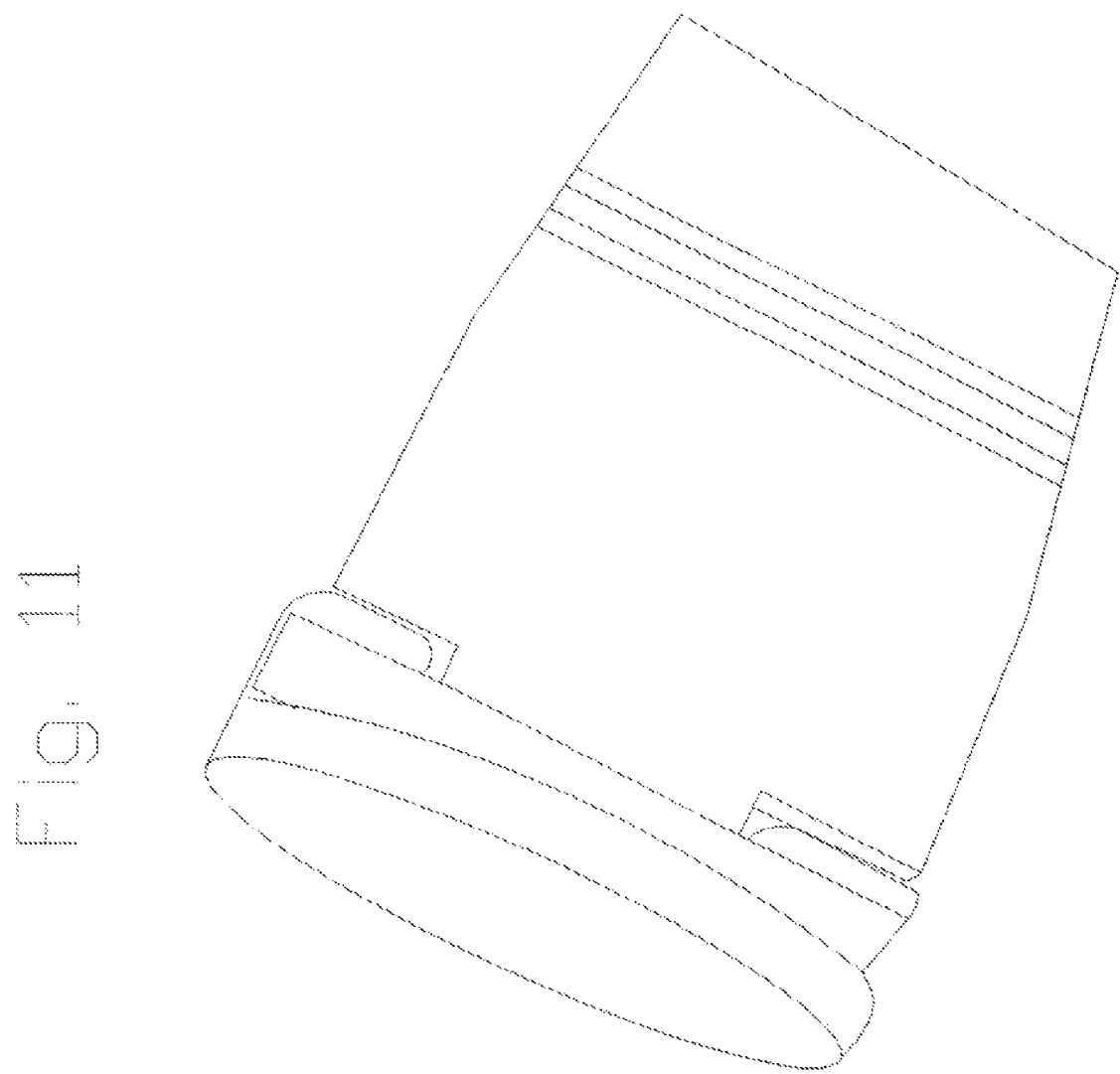

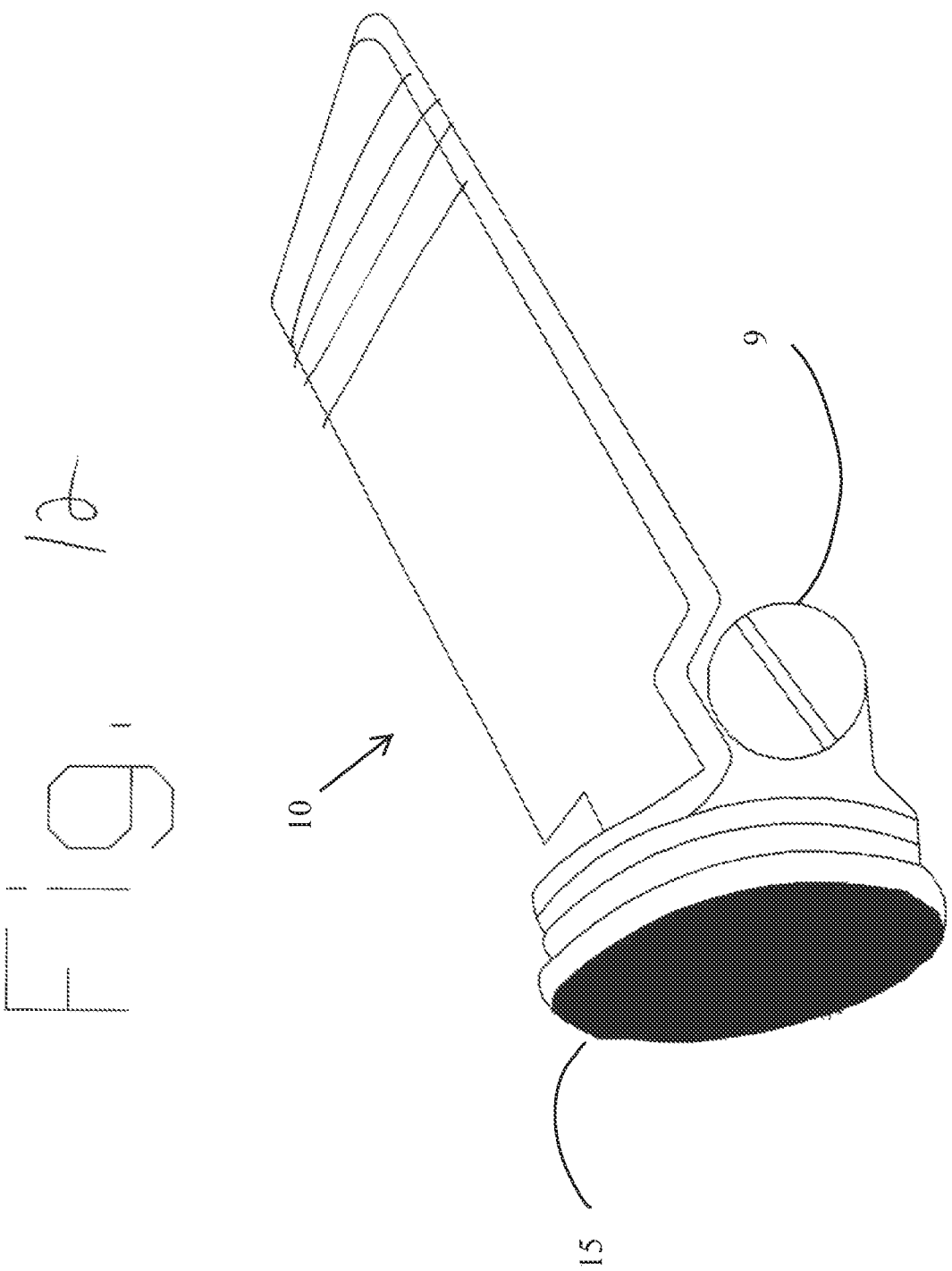

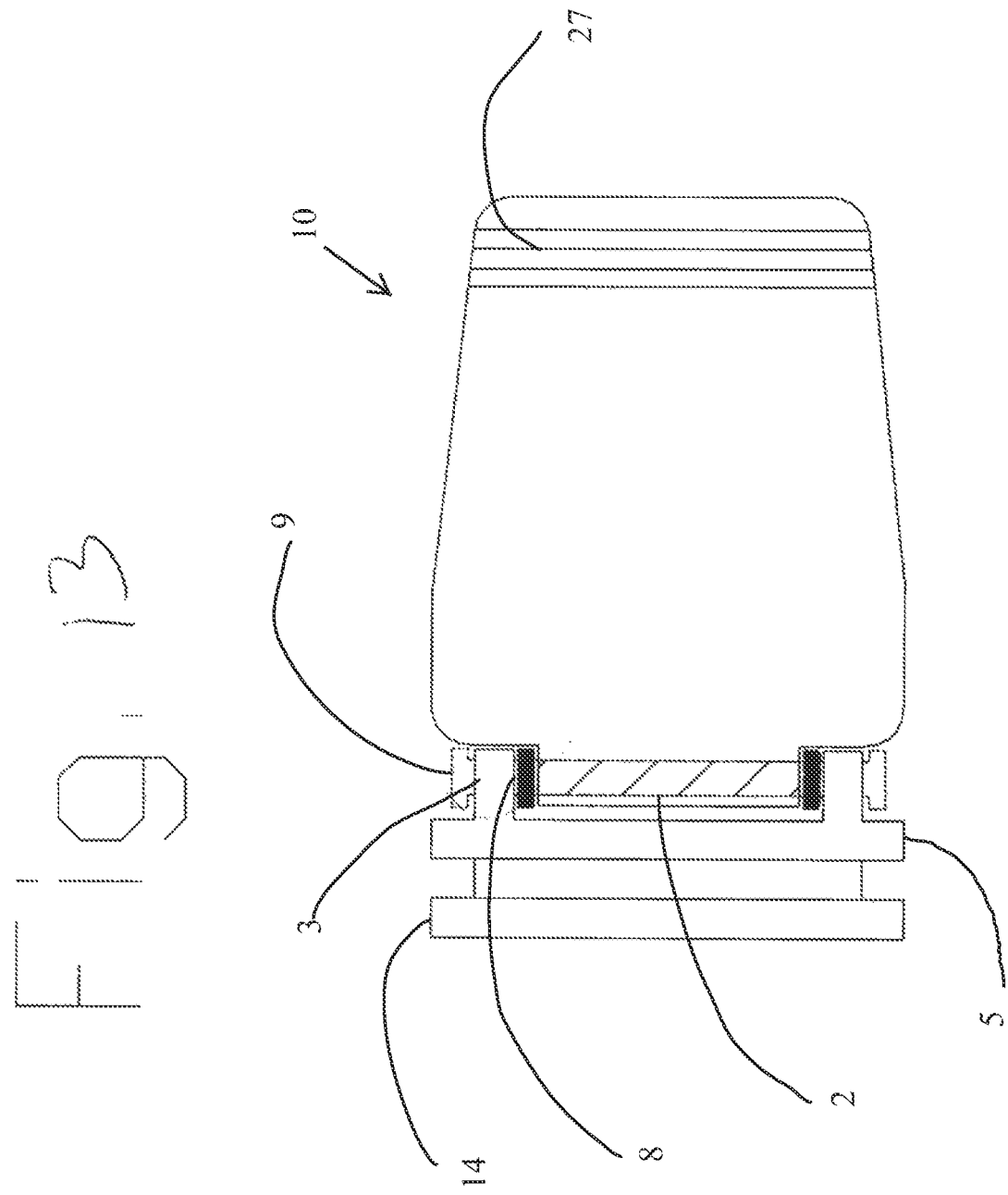

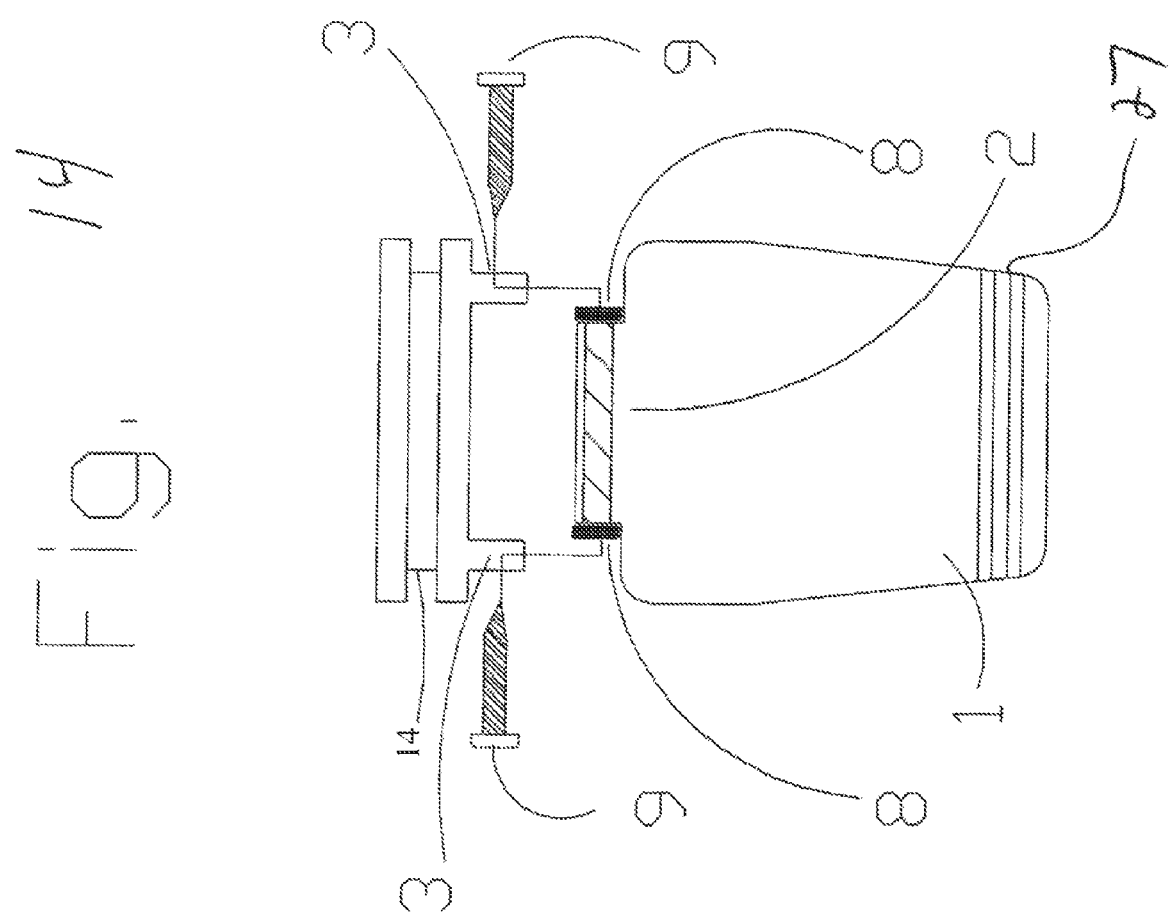

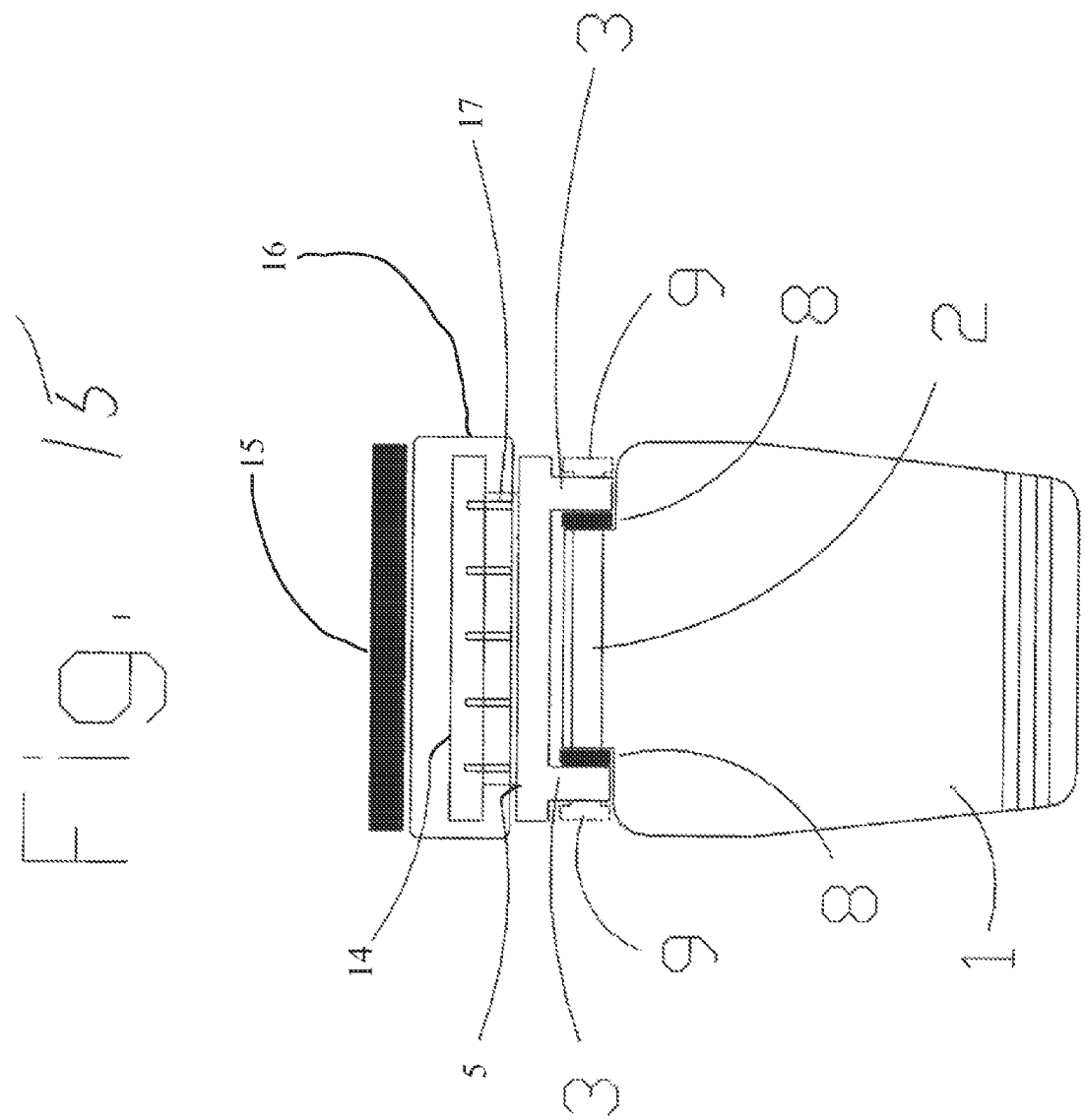

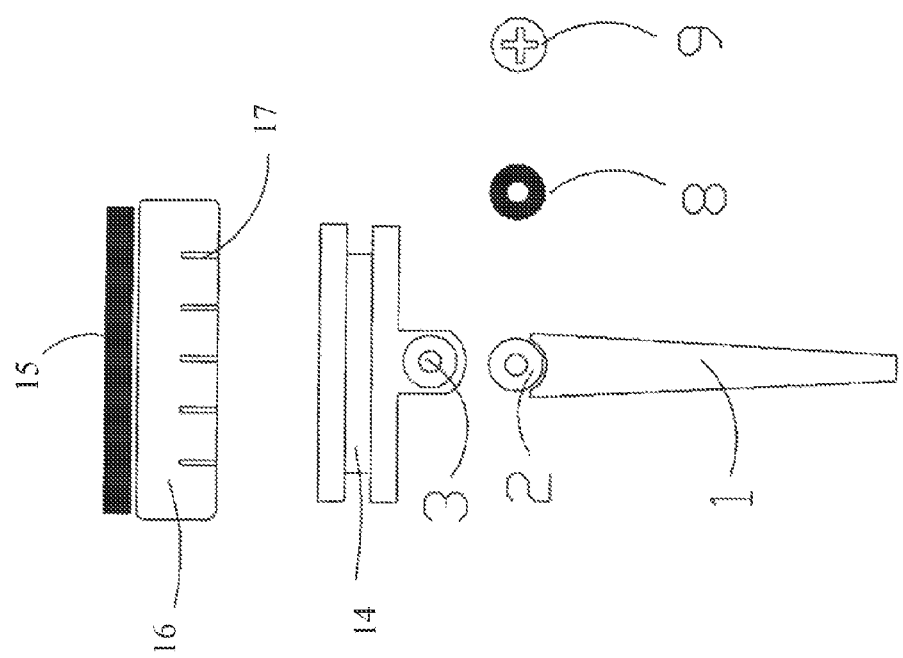

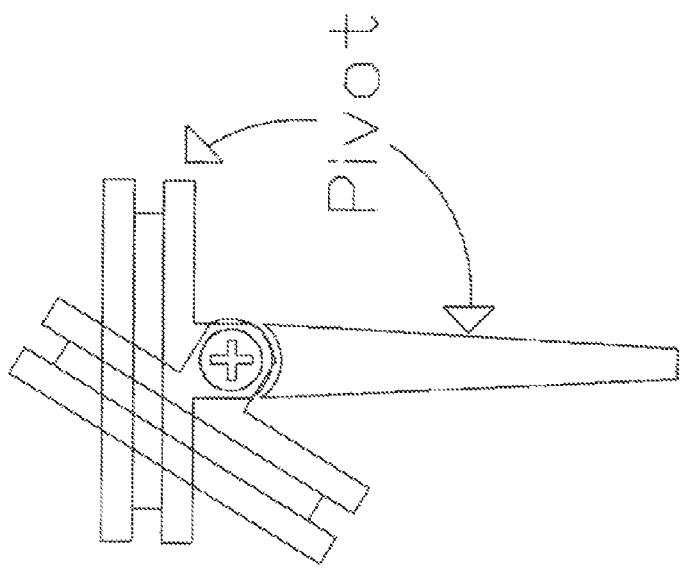

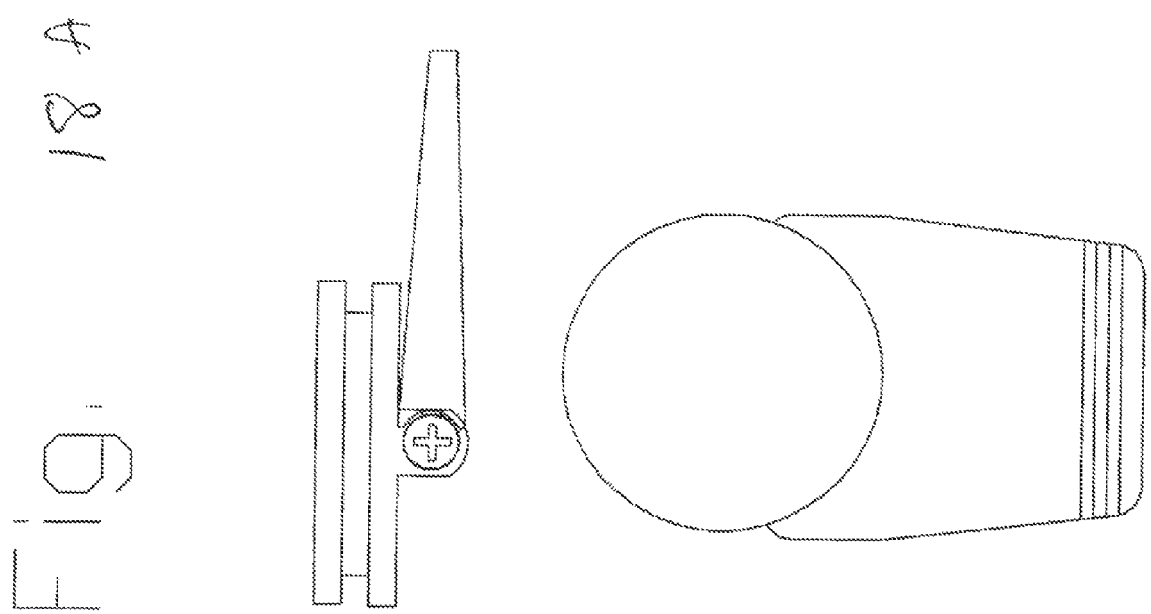

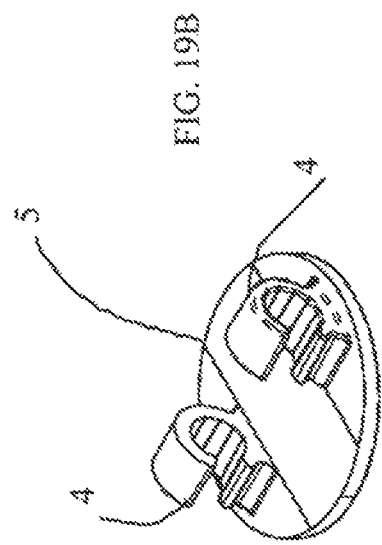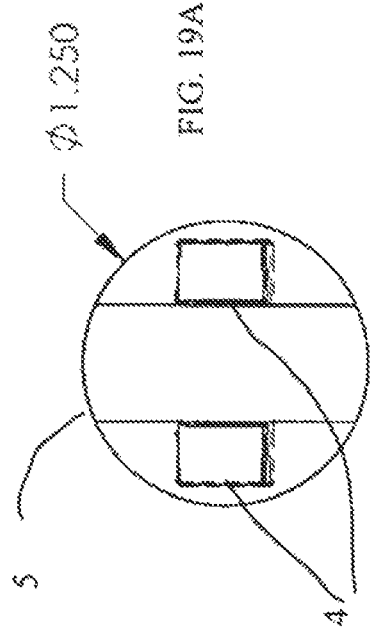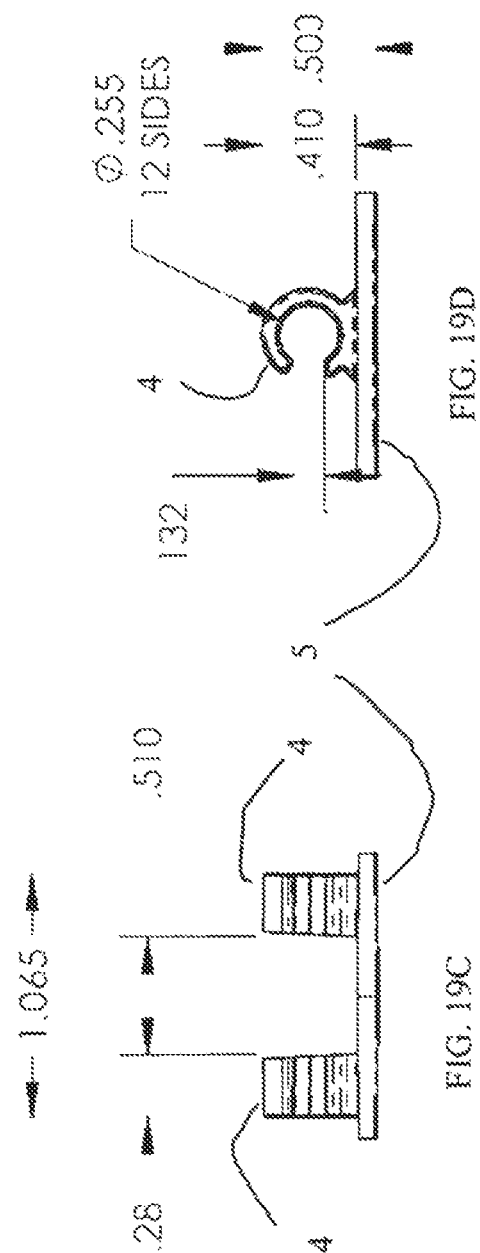

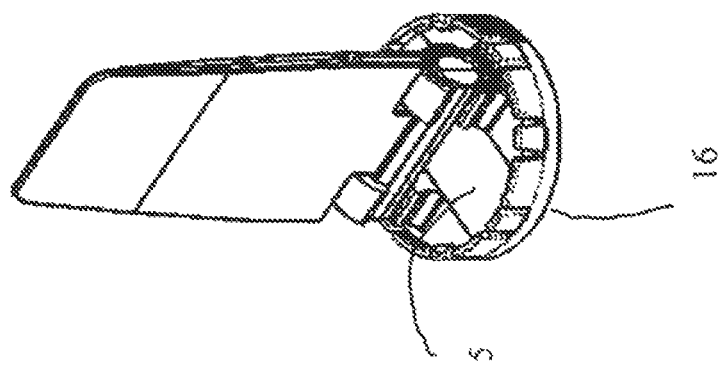
FIG. 19J
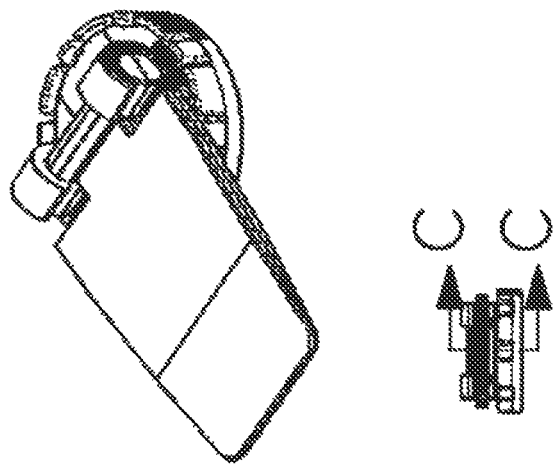
FIG. 19I
FIG. 19L
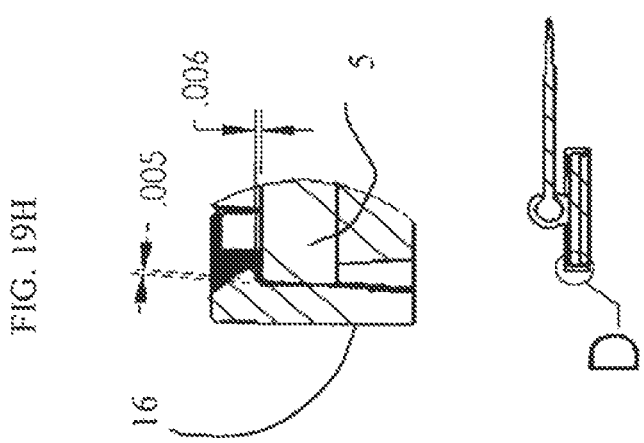
FIG. 19H
FIG. 19K

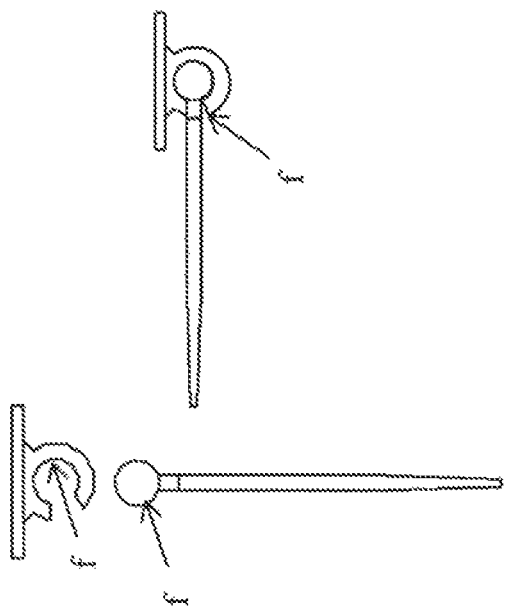

UNIVERSAL PORTABLE DEVICE STAND AND HOLDER APPARATUS

CROSS REFERENCE TO RELATED APPLICATIONS

The present application relates to and takes priority from co-pending U.S. Non-Provisional application Ser. No. 12/400,371, filed on Mar. 9, 2009 and entitled "A UNIVERSAL PORTABLE DEVICE STAND AND HOLDER APPARATUS", which application is hereby incorporated by reference its entirety, and which application takes priority from U.S. Provisional Application Ser. No. 60/034,997, filed on Mar. 9, 2008 and entitled "A UNIVERSAL PORTABLE DEVICE STAND AND HOLDER APPARATUS."

BACKGROUND OF THE INVENTION

1. Field of the Present Invention

The present invention relates generally to an apparatus that securely holds, supports and displays for adjustable viewing of portable electronic devices where the apparatus can be frictionally engaged into any accessible material seam as well as being supportable on flat surfaces.

2. Description of the Related Art

There are several prior art devices in the field. U.S. Pat. No. 6,888,940 discloses a device with magnetic holder having a cup formed of a ferromagnetic material. The rear surface of the cup includes a double-sided adhesive pad to provide attachment of the cup to a vehicle dashboard surface. An obvious drawback to this design is the lack of portability. Once affixed to the dashboard the device cannot be moved to another location. In addition, the adhesive will likely tarnish the finish on a dashboard substantially lowering the value the car. Another drawback exists in that the device is not easily adjustable preventing suitable viewing of the portable electronic device engaged thereto.

There exists a need to for a device that is removably attachable to an interior of a car to support an electronic device that may be propped up for better hands free viewing. Such a device will likely focus on the traveler which likely requires a portable holder movable from vehicle to vehicle.

Additionally, there exists a need for a device with an interchangeable cap for multiple applications and electronic devices.

There also exists a need for a device that maintains a portable electronic device in a car in a suitable viewing position without interfering with the viewing area of a driver. There also exists a need for a device to hold portable devices in an upright fixed position while driving within arms length of driver.

SUMMARY OF THE INVENTION

The present invention includes a universal portable device stand and holder apparatus.

In a first aspect, the present invention includes an elongated base portion having a wedge end and a pivot end; a mounting portion, the mounting portion rotationally and pivotally connected to the base portion at the pivot end, the mounting portion for releasably engaging the portable device; the mounting portion including a mounting cap structured and arranged to releasably engage the portable device; and the base portion having at least one ridge located substantially proximal to the wedge end and being substantially parallel to the pivot end, the at least one ridge including an elevated forward facing surface and an elevated rearward facing surface for frictionally engaging an orifice of a support structure in order to support the device and an engaged portable device in a desired position.

In some embodiments the apparatus includes a snap and fit connection, the snap and fit connection for connecting the mounting portion to the pivot end of the base portion.

In some embodiments the apparatus includes a pin connection, the pin connection for connecting the mounting portion to the pivot end of the base portion.

In some embodiments the base portion includes a tapered shape such that the pivot end has a larger width than the wedge end.

In some embodiments the base portion includes a wedge shape such that the pivot end has a large depth than the wedge end.

In some embodiments the mounting portion including a magnetic portion for engaging the portable device.

In some embodiments the mounting portion including a hook and loop combination for engaging the portable device.

In some embodiments the apparatus for supporting a portable device includes an elongated base portion having a wedge end and a pivot end, the pivot end having a first set of convex peaks in an alternating series with a first set of concave valleys. The embodiment also includes a mounting portion structured and arranged to releasably engage the portable device, the mounting portion includes at least one loop portion including a second set of convex peaks in an alternating series with a second set of concave valleys. The loop portion of the mounting portion is pivotally connected to the pivot end of the base portion where the first set of convex peaks and valleys engage the second set of convex peaks and valleys such that the mounting portion may be releaseably lockable with respect to the base portion. The base portion includes at least one ridge located substantially proximal to the wedge end and is substantially parallel to the pivot end. The at least one ridge includes an elevated forward facing surface and an elevated rearward facing surface for frictionally engaging an orifice of a support structure in order to support the device and an engaged portable device in a desired position.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 4a shows a rotated view of the apparatus as shown in FIG. 1 with the mounting portion rotated;

FIG. 9 shows another view of the apparatus as shown in FIG. 6;

FIG. 9a shows another view of the apparatus as shown in FIG. 9 in a rotated position;

FIG. 11 shows another view of the apparatus assembled as shown in FIG. 10;

FIG. 12 shows a perspective view of another device according to a second embodiment of the present invention;

FIG. 13 shows a side view of the device as shown in FIG. 12;

FIG. 14 shows a rotated exploded view of the device disassembled as shown in FIG. 12;

FIG. 15 shows a side view of the device assembled as shown in FIG. 14;

FIG. 16 shows a rotated exploded view of the device disassembled as shown in FIG. 12;

FIG. 17 shows an opposite side view of the device as shown in FIG. 12 with the mounting portion rotated;

FIGS. 18A and 18B show a side view and a top view respectively of the device as shown in FIG. 12 with the mounting portion rotated completely;

FIGS. 19A-19L show various exploded and assembled views of apparatus 10 according to one embodiment of the invention;

FIGS. 22 A and 22B show a disassembled and assembled view of apparatus 10 according to one embodiment of the invention;

DETAILED DESCRIPTION OF THE PREFERRED EMBODIMENTS

The present disclosure will now be described more fully with reference to the Figures in which an embodiment of the present disclosure is shown. The subject matter of this disclosure may, however, be embodied in many different forms and should not be construed as being limited to the embodiments set forth herein.

The device includes base portion with ridges that can be frictionally engaged into any crevice or seam in car's interior as well as seam in a airplane seat tray table configuration. Where there is a crevice created between the tray and the seat back when the tray is in its upright and locked position. The base portion may be wedged into the tray table seat back crevice into a cantilevered position to hold a portable electronic device in place in front of a passenger for easy viewing. The device does not leave a footprint on the dash board or any other surface.

The device wedges into a seam in the dash board and is removable and usable in other cars or other locations that have a location to receive the base portion wedge end and frictionally engage the ridges to support the holder and a portable electronic device. Due to the high tension pivot mechanism, the holder is usable on many applications including on a flat surface.

The use of magnetic is useful for some devices that include a magnetic pad secured thereon and can be magnetically fixed to the mounting portion. The device is small, portable and usable in many applications and location.

Figure 1:
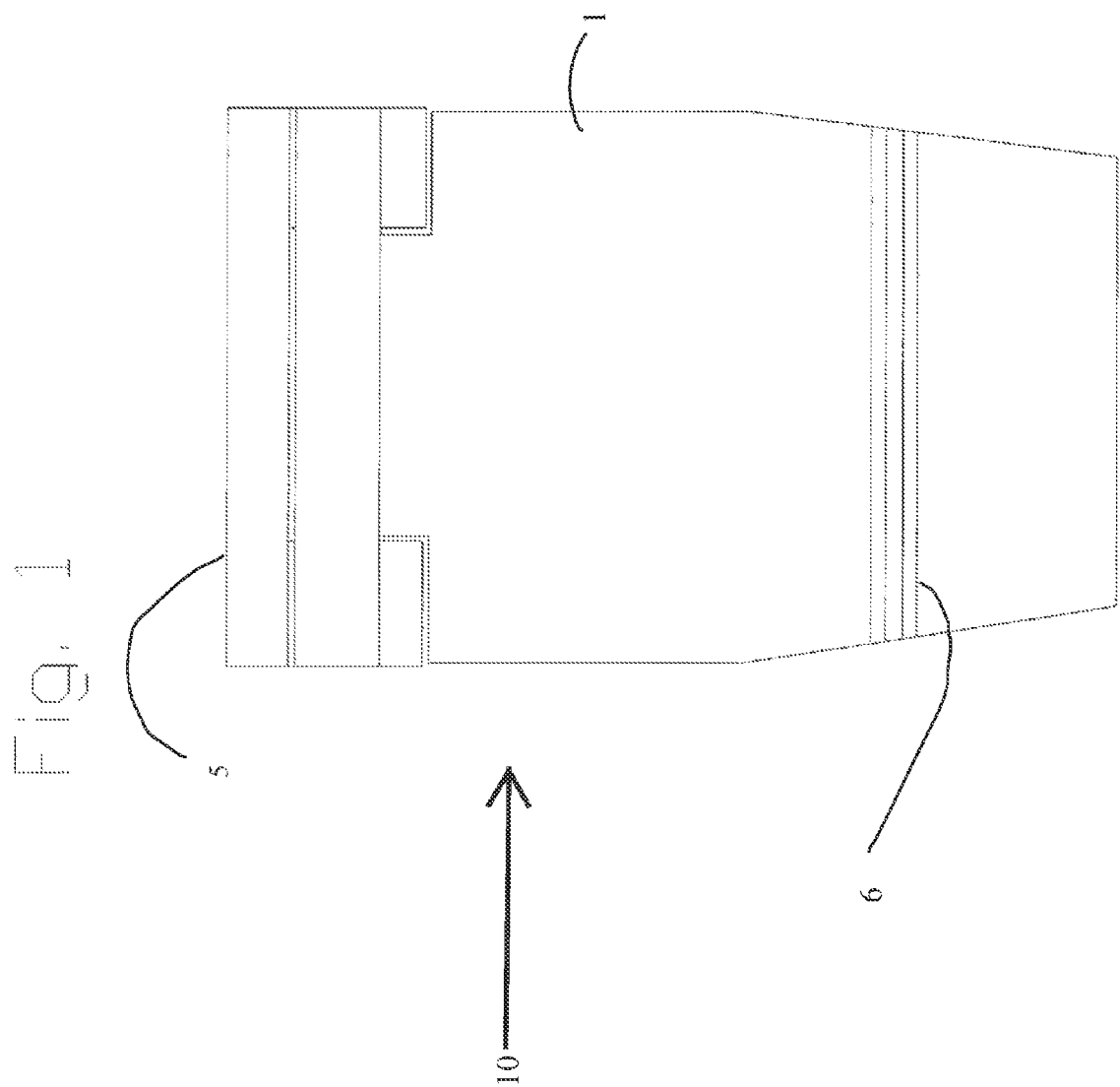
FIG. 1 shows a forward view of the apparatus according to one embodiment of the present invention.
Figure 2:
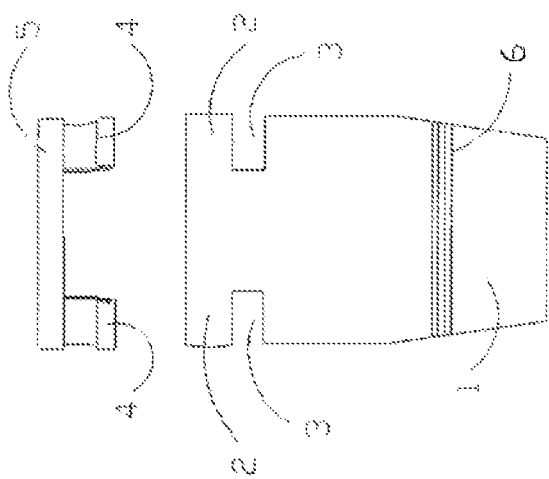
FIG. 2 shows a disassembled view of the apparatus as shown in FIG. 1.
Figure 3:
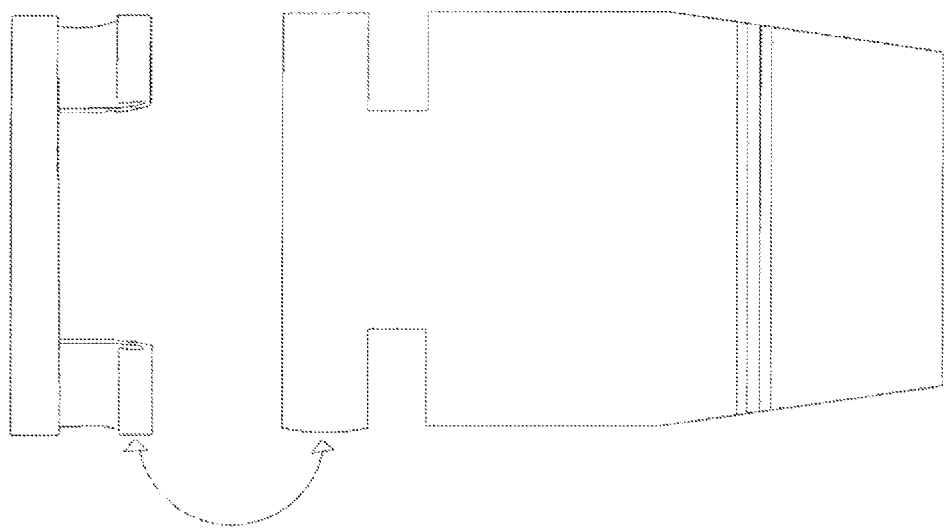
FIG. 3 shows an expanded view of the apparatus as shown in FIG. 2.
Figure 4:
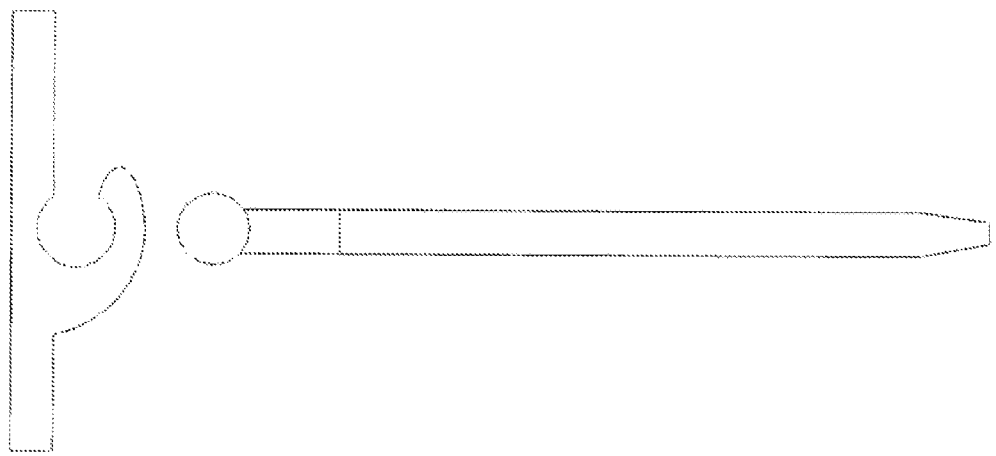
FIG. 4 shows rotated view of the apparatus as shown in FIG. 2.
Figure 5:
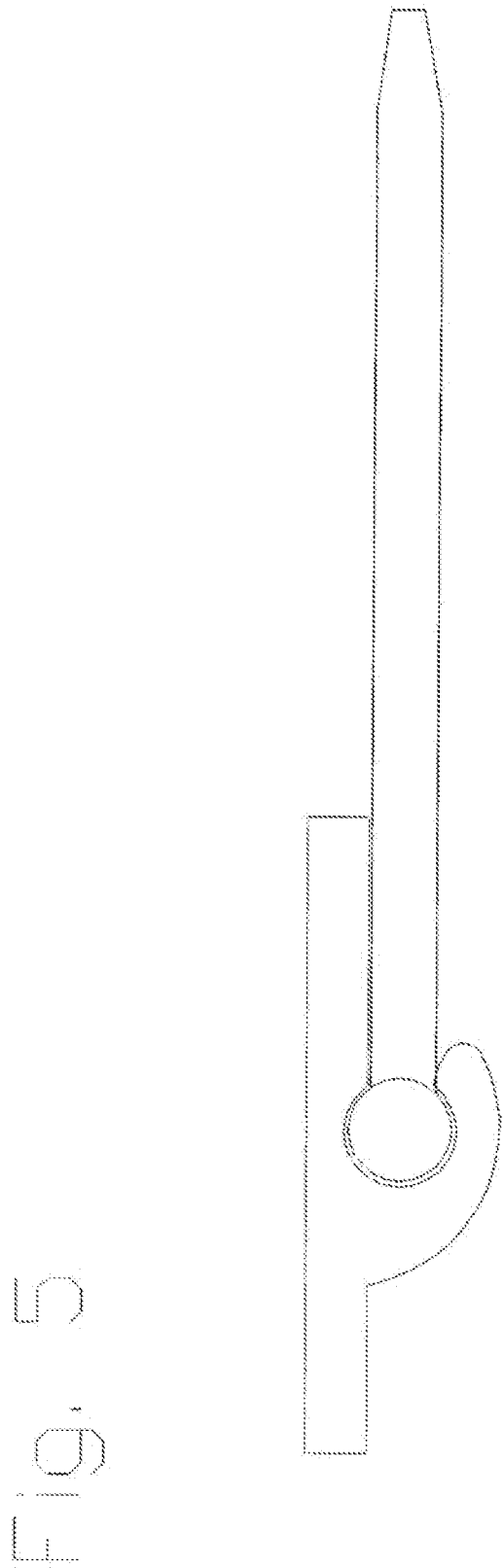
FIG. 5 shows a rotated view of the apparatus as shown in FIG. 4a with the mounting portion rotated completely.

Parts List:
1—base portion
2—cantilever beam portion
3—notch position
4—retention loops
5—interchangeable cap/top mounting portion
6—friction engaging ridges
8—pivot pin aperture
9—pivot pin
10—entire apparatus
14—interchangeable cap interface
15—magnetic fitting
16—rotational cap
17—cap ridges
27—alternate base portion friction ridges
30—improved cantilever portion
35—cantilever gears
37—cantilever gears convex peaks
39—cantilever gears concave valleys
40—improved loops
45—internal loop gears
47—internal loop gear convex peaks
49—internal loop gear concave valleys Referring now to FIG. 1 there is shown a forward view of apparatus 10 according to one embodiment of the present invention. Apparatus 10 includes base portion 1 having friction engaging ridges 6 and is rotationally connected to interchangeable cap/top mounting portion 5. FIG. 2 shows and exploded view of apparatus 10 as shown in FIG. 1. Mounting portion 5 includes indents/grooves 4 which are structured and arranged to connect to base portion 1 at fastener attachment pivots 2 as shown in FIG. 3. Indent/grooves 4 removably connect to base portion 1 via apertures 3 allowing mounting portion 5 to rotate axially and perpendicular to base portion 1. FIGS. 4, 4a, and 5 show side view of apparatus 10 with mounting portion 5 removed, connected and fully rotated in conjunction with base portion 1.

Figure 6:
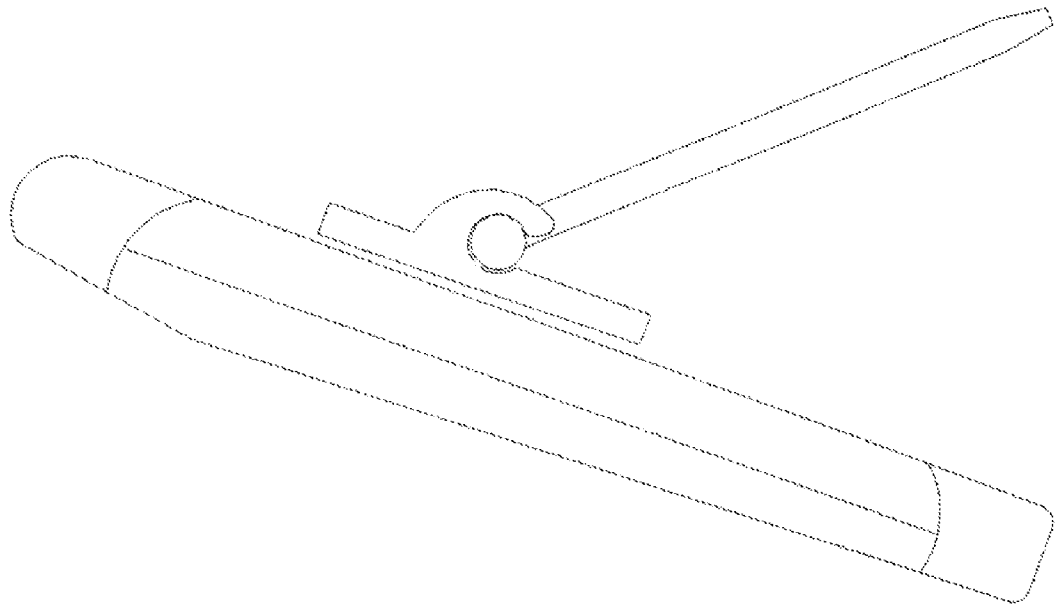
FIG. 6 shows the apparatus as shown in FIG. 1 engaged with a portable electronic device disposed on a flat surface.
Figure 7:
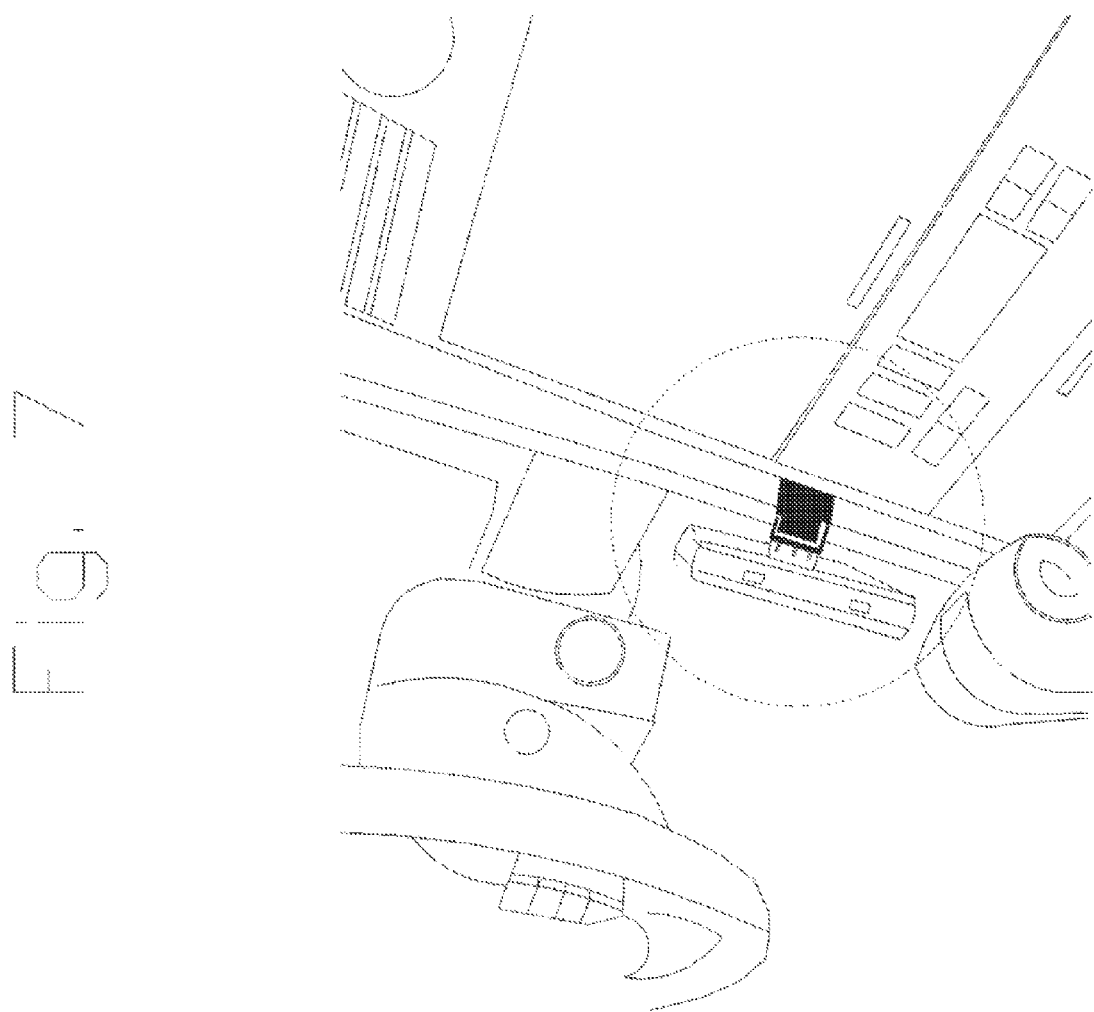
FIG. 7 shows the apparatus as shown in FIG. 1 engaged with a portable electronic device disposed in a wedged vehicle seam position.

FIG. 6 shows apparatus 10 releaseably connected to a portable electronic device and angled sufficiently to maintain the device in an upright position. FIG. 7 and show different views of the apparatus 10 connected to another portable electronic device and engaged with a dashboard seam located in a vehicle. FIG. 9 shows apparatus 10 engaged with a portable electronic device in a vertical upright position located on a flat desk surface. FIG. 9a shows apparatus 10 engaged with a portable electronic device in a horizontal upright position located on a flat desk surface.

Figure 10:
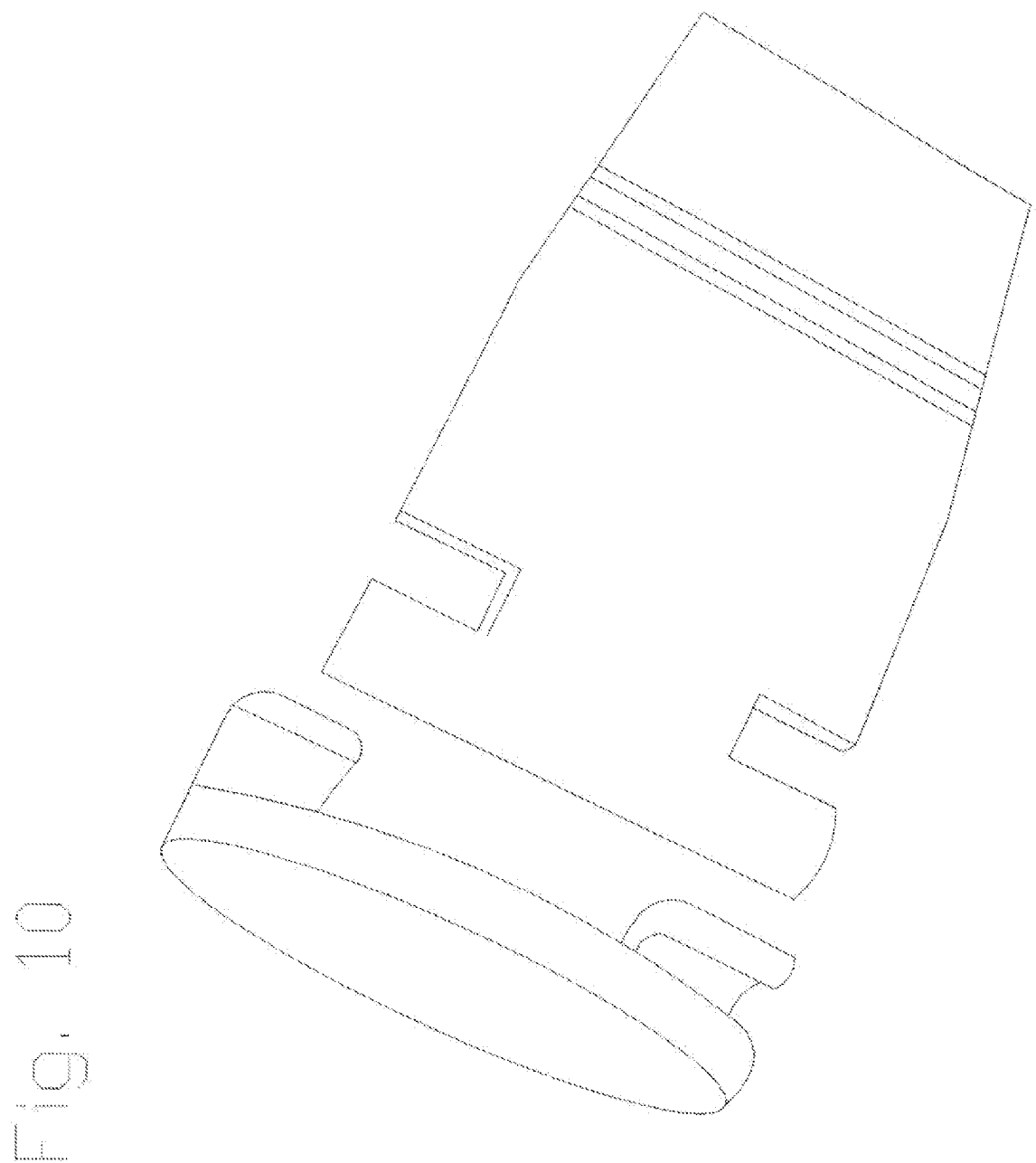
FIG. 10 shows an expanded perspective view of the apparatus disassembled.

FIG. 10 shows a perspective and exploded view of the apparatus 10 with mounting portion 5 detached from base portion 1. FIG. 11 shows a perspective and exploded view of the apparatus 10 with mounting portion 5 attached to base portion 1.

FIG. 12 shows an alternative embodiment of apparatus 10 in perspective view with mounting portion 5 attached to base portion 1 view pivot pin 9. Mounting portion 5 is shown with a magnetic fitting 15. Magnetic fitting 15 is designed to releaseably engage the back side of the portable electronic device having a ferrous material thereon.

FIG. 13 shows a side view of apparatus 10 as shown in FIG. 12 in a rotated position with a interchangeable cap interface 14 connected to mounting portion 5. Base portion 1 also includes alternative ridges 27. Mounting portion 5 is rotationally connected to base portion 1 via pins 9. Base portion 1 alternatively includes pivot pin aperture 8 structured and arranged to receive pivot pins 9. Mounting portion 5 includes pin apertures 3 designed to received and pass therethrough pivots 9. FIG. 14 shows apparatus 10 according to FIG. 13 in an exploded view.

FIG. 15 shows another alternative embodiment of apparatus 10 with mounting portion 5 having a rotational cap 16 with magnetic fitting 15 affixed thereon. Rotational cap also include cap ridges 17 and in some embodiments the rotational cap is designed to releasable connect to a belt clip worn by a user (not shown).

FIG. 16 shows a side and exploded view of the apparatus according to FIG. 15. FIG. 17 shows a side view of apparatus 10 according to FIG. 15 with mounting portion 5 in rotated position relative to base portion 1. FIGS. 18a and 18b show various views of apparatus 10 according to FIG. 15 from a forward position with mounting portion 5 in a completely rotated position relative to base portion 1.

Figure 19G:
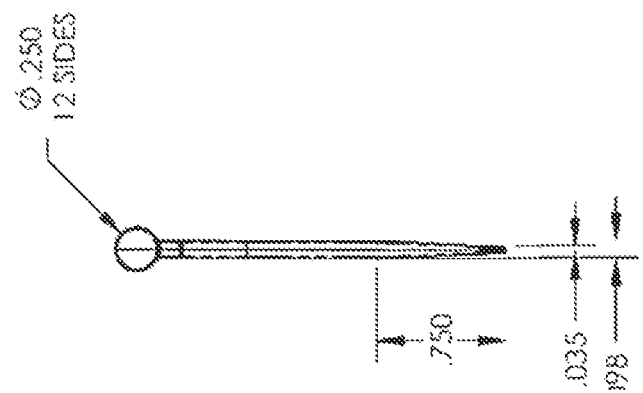

FIGS. 19A through 19L show various exploded viewed of apparatus 10. FIG. 19B shows mounting portion 5 inverted to view retention loops 4, as can be seen loops 4 have grooves interior surface. When mated with cantilevered beam portions 2 the grooved surfaces act to allow space shift rotations at specific angular amounts. For example in FIG. 19A loops 4 are shown with 12 sides, each having a length of about 0.255 inches. As such when base portion 1 is mated with mounting portion 5 base portion 1 can be rotated in 12 specific positions. It is understood that other dimensions of the loop 4 interior will suffice as long as a sufficient releasable snap-fit connection attained between base portion 1 and mounting portion 5.

Figure 19F:
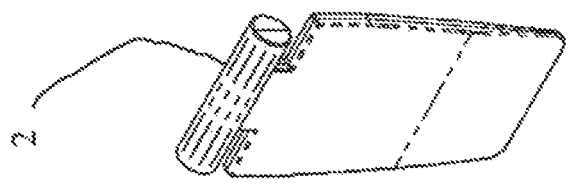
Figure 19E:
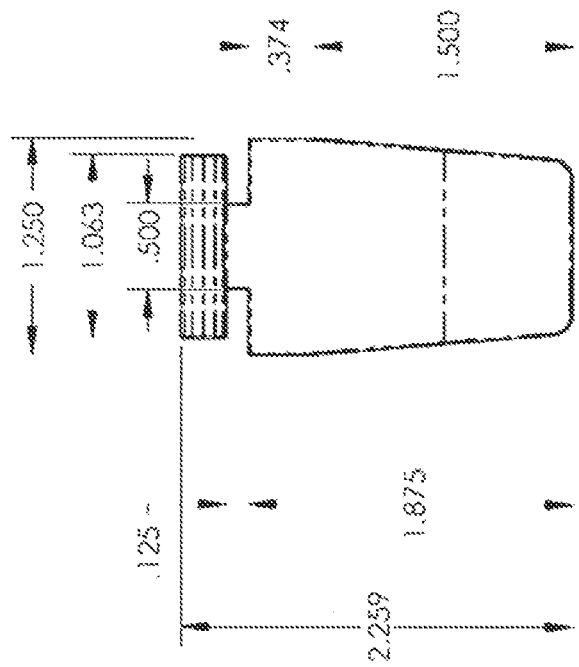

FIGS. 19E-19G show base portion 1 with cantilevered beam portion 2 having a 12 sided shape to be mated with retention loops 4 as shown in FIGS. 19B and 19 D.

FIGS. 19H-19L show perspective and enlarge views of apparatus 10. Specifically FIG. 19k shows a side cut out view of apparatus 10 along a cut line C-C as shown in FIG. 19L. FIG. 10H shows exemplary dimensions of a rotational cap 16 fitted onto mounting portion 5.

Figure 20:
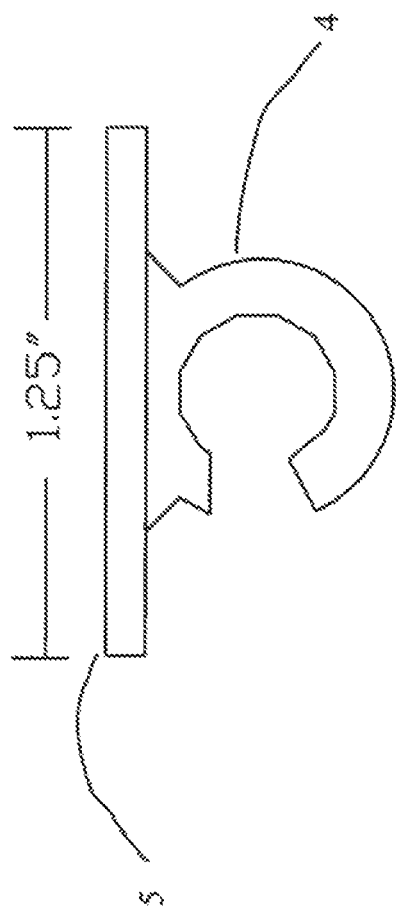
FIG. 20 shows an enlarged view of the mounting portion 5 according to one embodiment of the invention.

FIG. 20 shows an enlarged view of mount portion 5 with retention loop 4 having a 12sided interior for receiving a 12 sided cantilevered beam portion 2 of base portion 1. Mounting portion 5 is further shown with an exemplary size of about 1.25 inches.

Figure 21A:
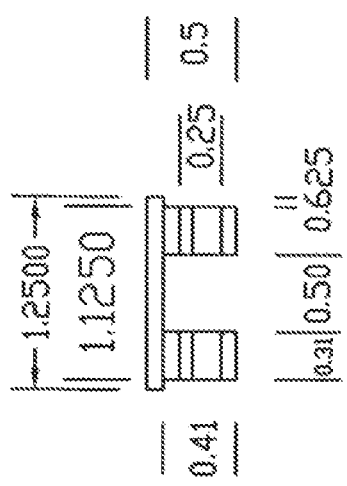
FIGS. 21A and 21B show a side view of mounting portion 5 without exemplary sizes and dimensions.
Figure 21B:
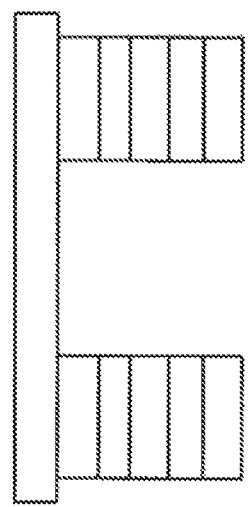

FIGS. 21A-21B show a side and cut-away view of mounting portion 5 specifically showing the interior of retention loops 4 having exemplary dimensions FIGS. 22A-22B show apparatus 10 in a disassembled and assembled view where cantilevered beam portion 2 of base portion 1 is designed to snap-fit into loops 4 of mounting portion 5 along line f.

Figure 23:
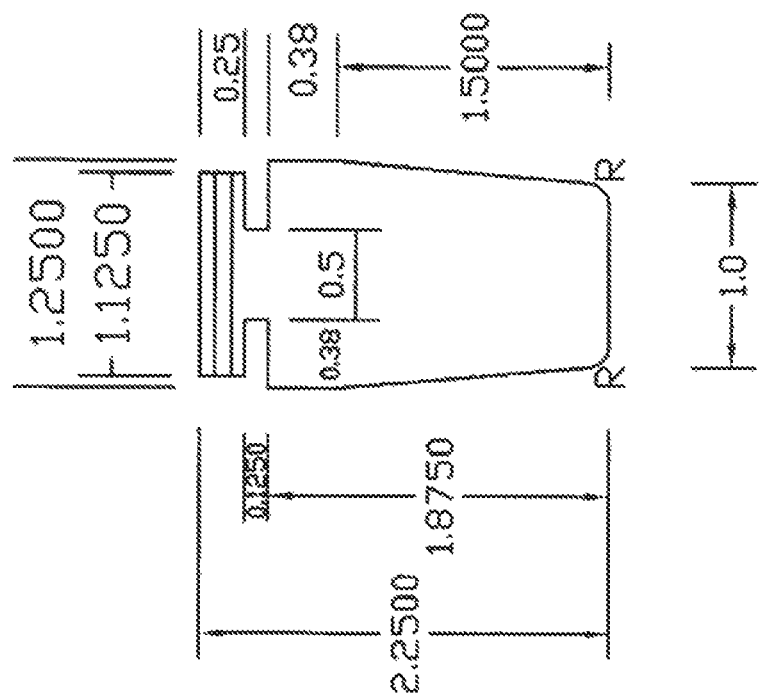
FIG. 23 shows and enlarge view of base portion 1 with exemplary sizes and dimensions.

FIG. 23 shows base portion 1 with cantilevered beam position 2 having exemplary sizes and dimensions.

Figure 24B:
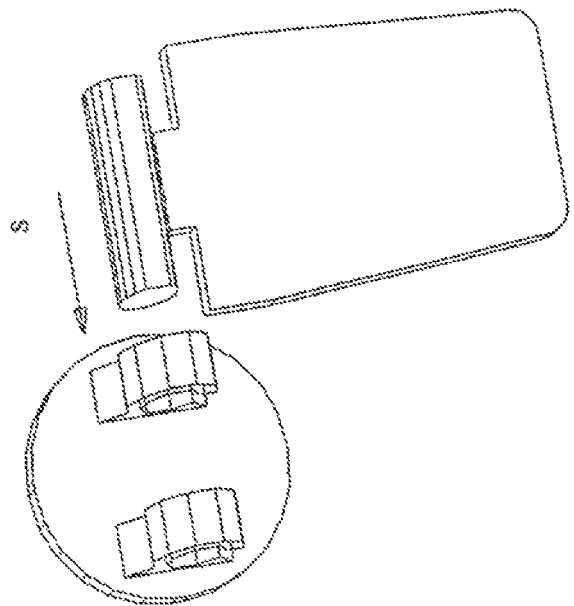
FIGS. 24A and 24B show enlarged and perspective views of apparatus 10 in the assembling process.
Figure 24A:
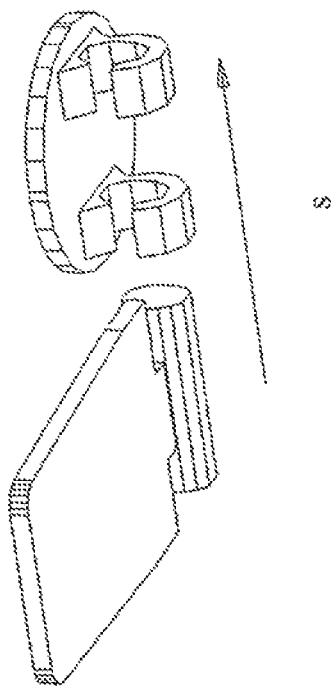

FIGS. 24A-24B show perspective views of apparatus 10 being assembled in an alternative fashion. Cantilevered beam portion 2 is lid in the direction of line s and engages retention loops 4 along the edges of the interior of loops 4. In this embodiment cantilevered beam portion 2 is preferably the same shape and dimensions as the interior of retention loops 4.

Figure 8:
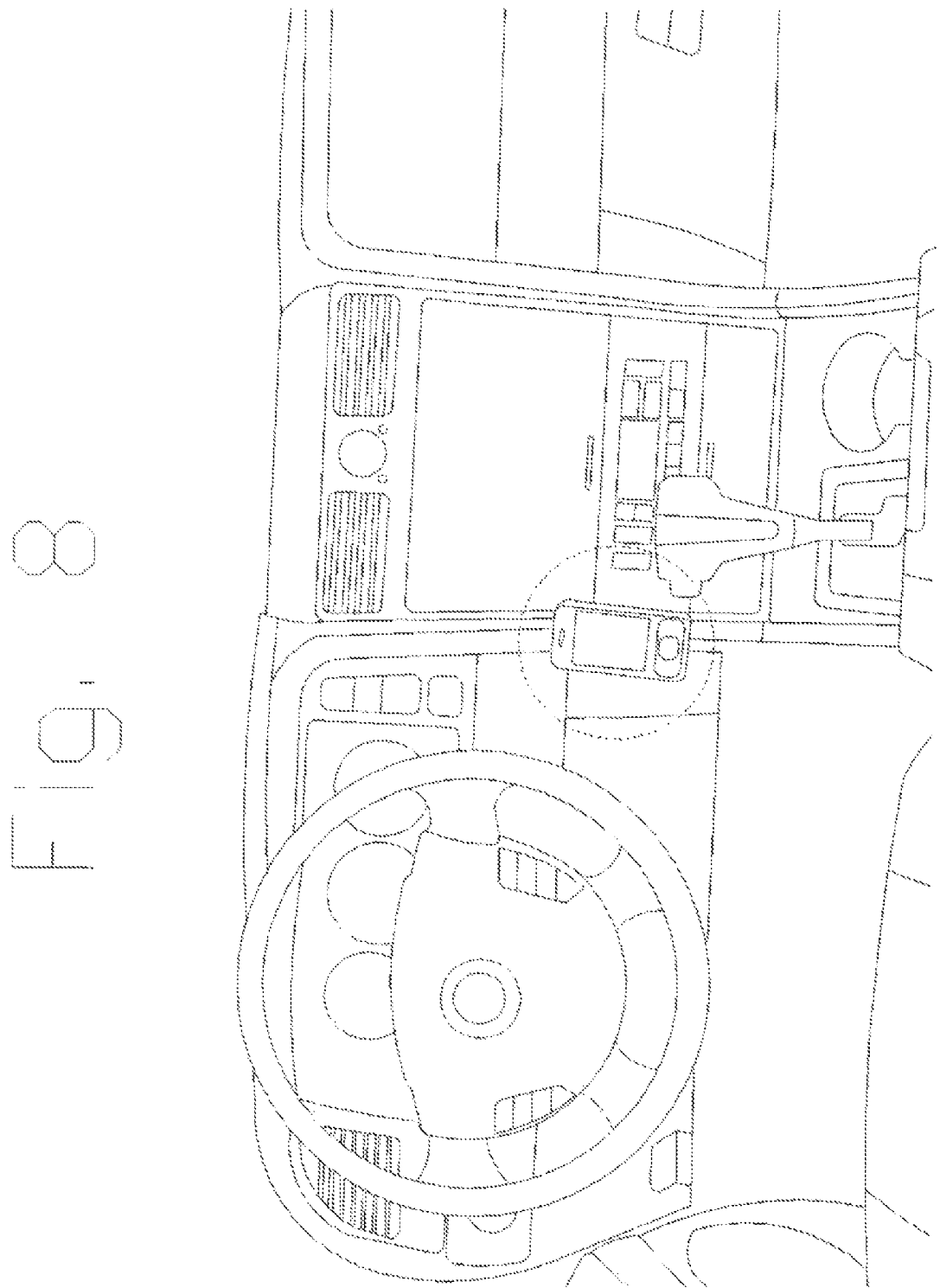
FIG. 8 shows the apparatus as shown in FIG. 7 from a front perspective.

Friction engaging ridges 6 and 27 are designed to frictionally engage any tight fitting seam, for example, such as the seams in a car dashboard as shown in FIGS. 7 and 8. The ridges are designed to securely fasten apparatus 10 along with a portable electronic device to a dashboard seam in such a position so that the user may operate the vehicle and safely view the business end of the electronic device without holding it. The number of ridges can be as shown, specifically four ridges. However any number of ridges can be used for suitable affixing into a seam. Additionally the dimensions of the ridges can vary from triangular to square to round depending upon the specific seam required. Critical to the invention is that the ridges frictionally engage a seam with the ability to be removed without damaging the surface of the seam joint.

In addition, base portion 1 may also be inserted into a seam in any location within the viewing area of a user, such as for example, the seam of a tray table in an upright and locked position on the back of an airplane seat. The rotational aspect of mounting portion 5 relative to base portion 1 allows the user to affix the apparatus into any suitable seam and still allow unobstructed hands free viewing of the business end of a portable electronic device.

The apparatus is preferably made from a flexible yet strong material in order to adequately secure portable devices many times the weight of the apparatus itself. Suitable materials can include polymers plastics, rubber, metal and wood. Critical to the preferred embodiment is the fact that the apparatus is lightweight yet sturdy. To this end, any suitable material will suffice.

Figures 25A, 25B:
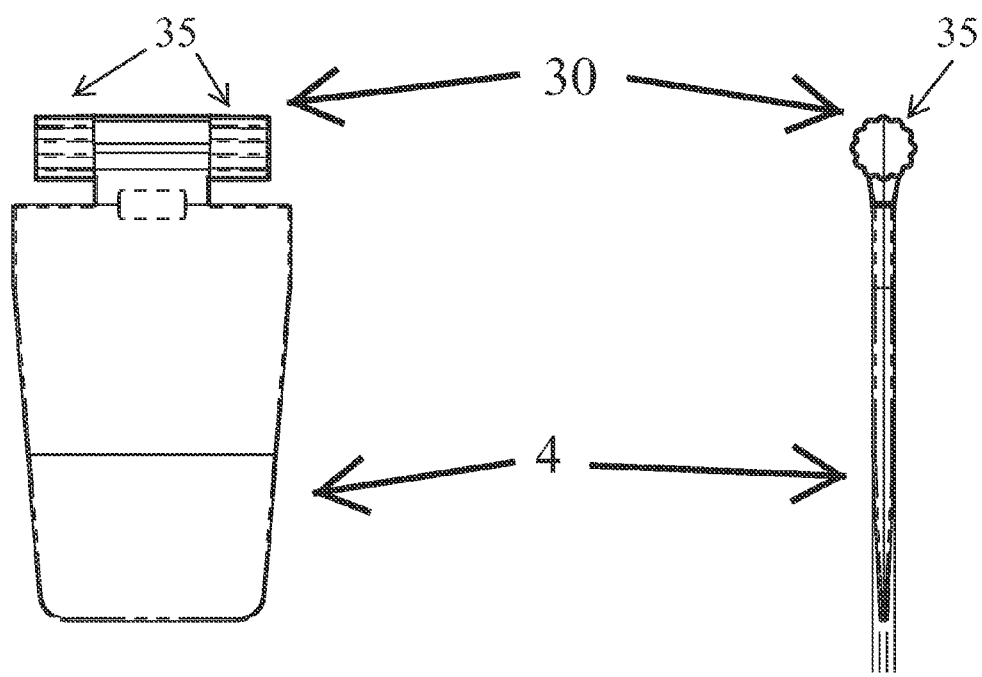
FIG. 25 shows a front view of the base portion according to an improved embodiment of the invention.

Referring now to FIGS. 25A and 25B which show a front and side view of the base portion 1. Base portion 1 included improved cantilevered beam portion 30, having thereon cantilever gears 35.

Figure 26:
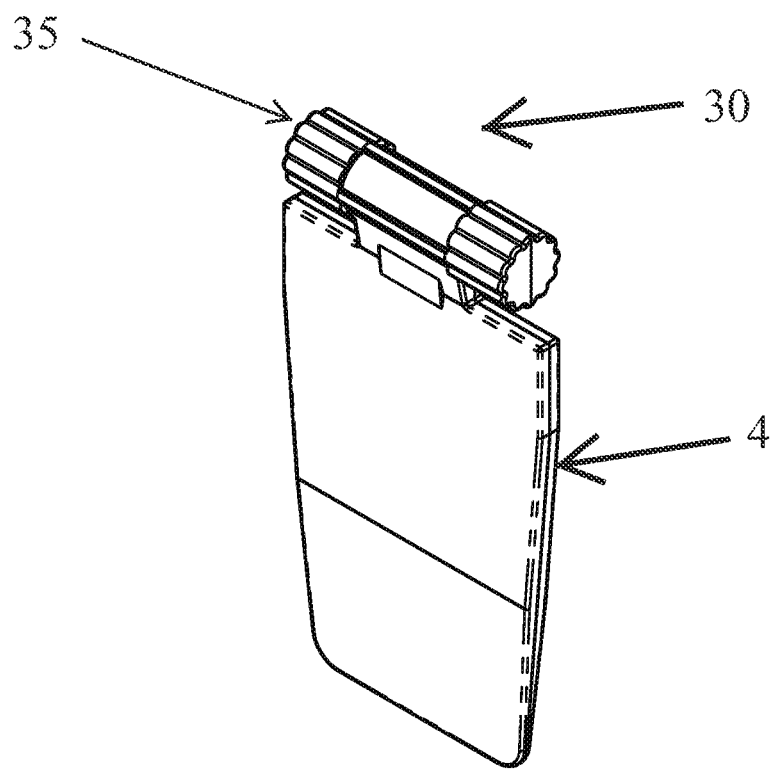
FIG. 26 shows a side view of the base portion shown in FIG. 25 according to an improved embodiment of the invention.

Referring now FIG. 26 there is shown a perspective view of the base portion shown in FIGS. 25A and 25B according to an improved embodiment of the invention. It can be seen that the pivot end of base portion 1 includes improved cantilever beam portion 30. The pivot end of the base portion 1 is generally cylindrical having an axis substantially parallel to the plane upon which the wedge of the base portion 1 is affixed. As stated earlier the wedge portion of base portion 1 is preferably tapered in a direction opposite from the pivot end and preferably includes raised ridges such that when engaged with a seam or crevice the ridges will frictionally engage the walls of such seam or crevice in a manner that will stabilize the apparatus when a portable device is releaseably affixed thereto.

Figure 27:
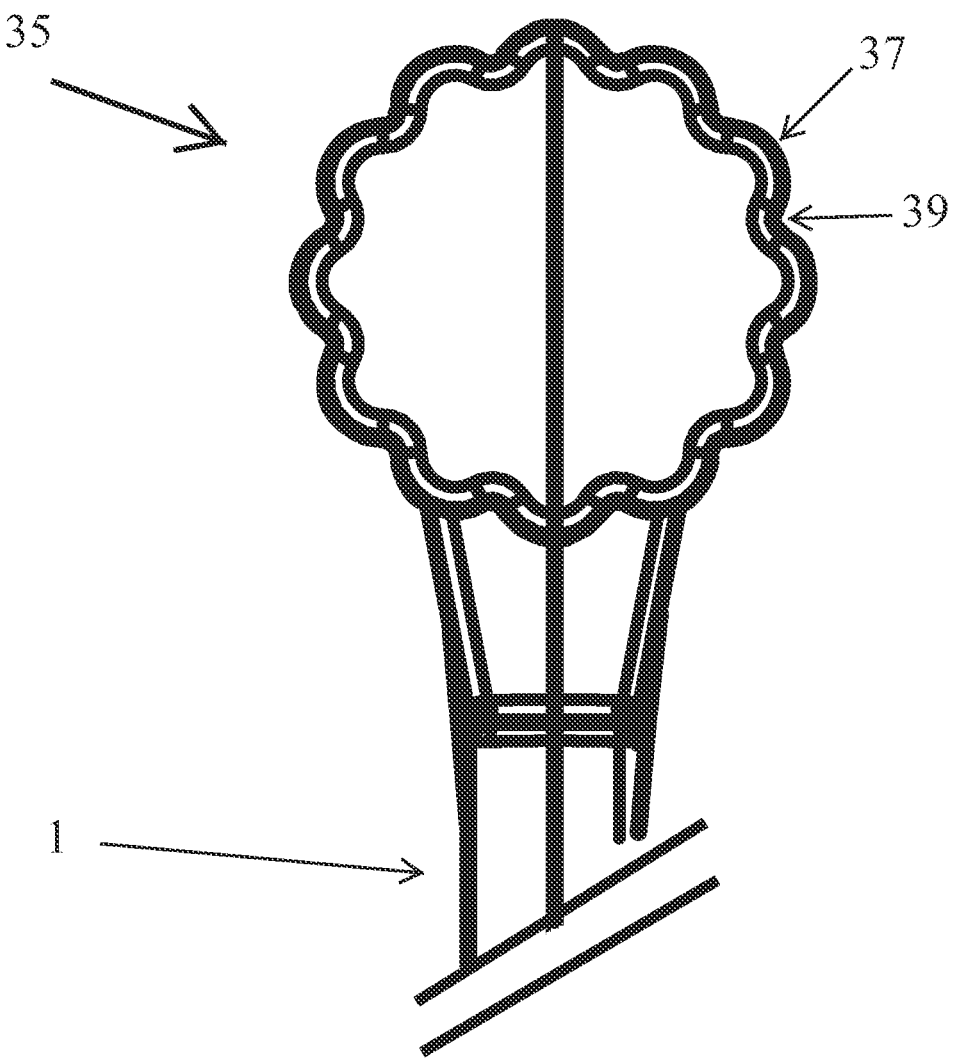
FIG. 27 shows a perspective view of the base portion shown in FIGS. 25 and 26 according to an improved embodiment of the invention.

FIG. 27 shows an enlarged side view of the improved cantilevered beam portion 30 as shown in FIGS. 25A and 25B improved cantilevered beam portion 30 includes a plurality of Gears 35 which are preferably structured and arranged with a series of convex peaks 37 and concave valleys 39. As shown there are 14 peaks and valleys which are designed to engage with improved loop 40, which loop 40 is described below in connection with FIGS. 28-30.

Figure 28:
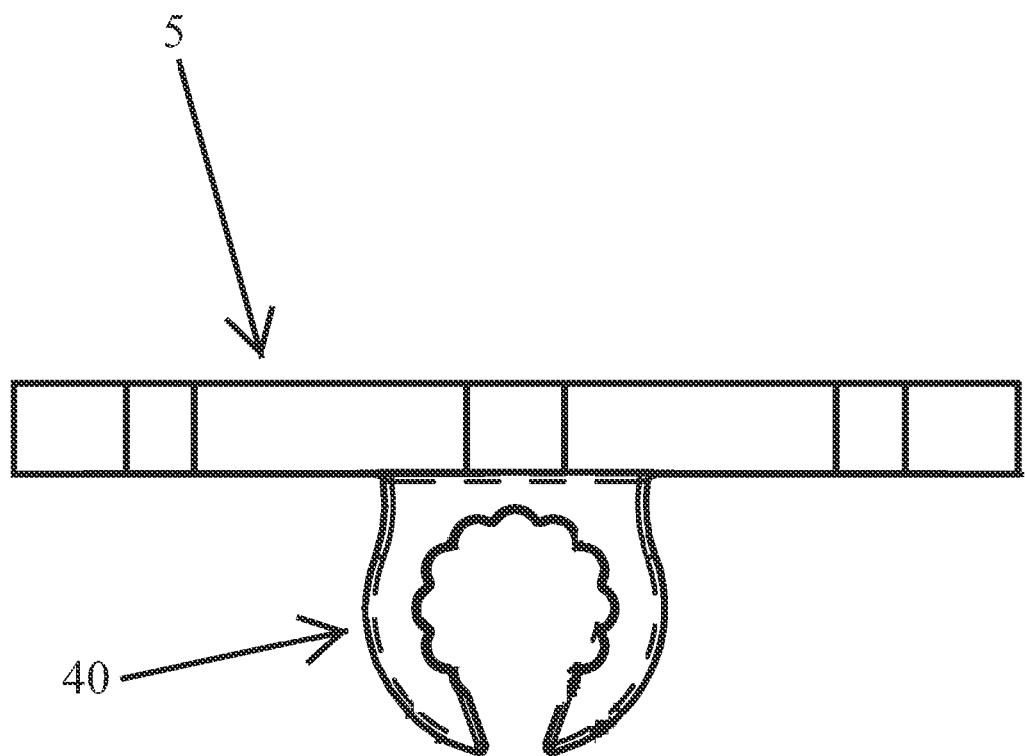
FIG. 28 shows a side view of the cap according to an improved embodiment of the invention.

FIG. 28 shows a side view of the cap according to an improved embodiment of the invention.

Figure 29:
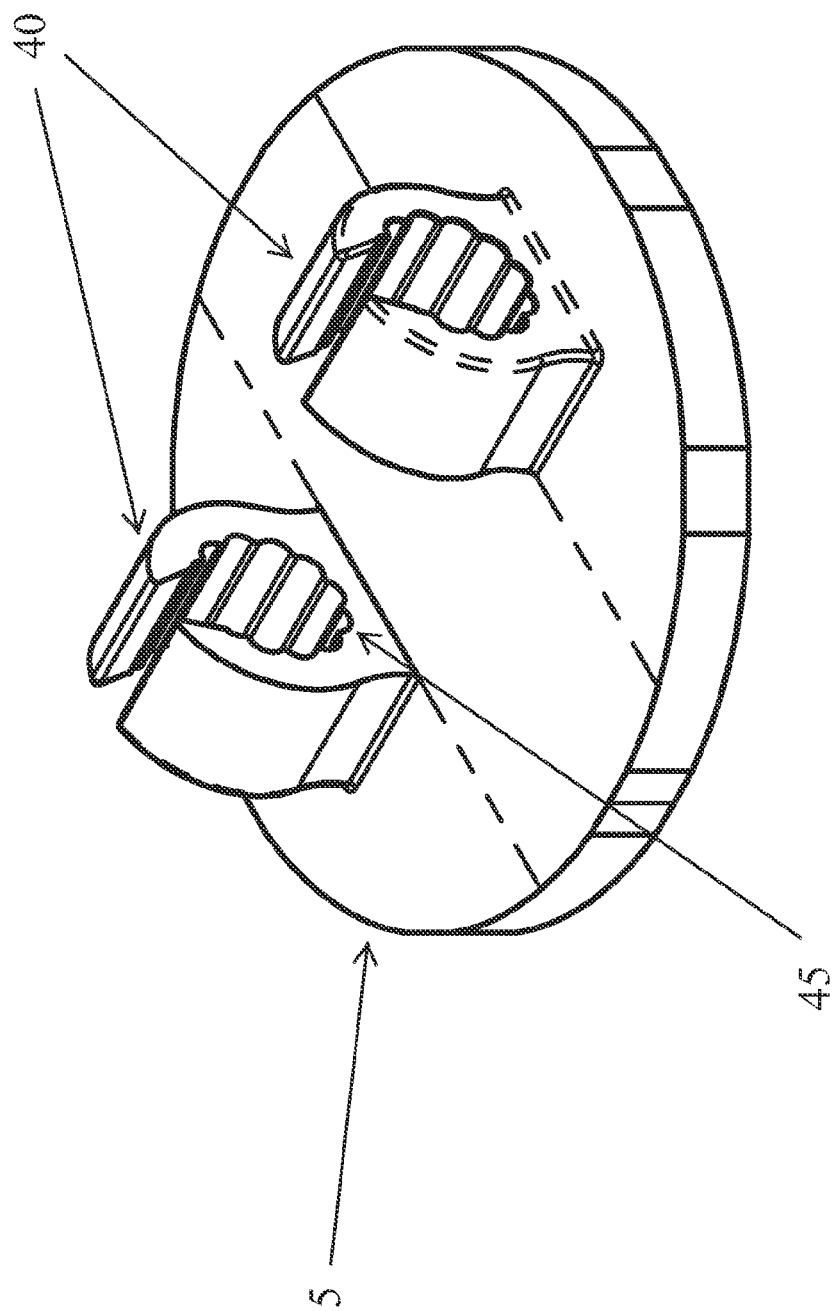
FIG. 29 shows a perspective view of the cap shown in FIG. 28 according to an improved embodiment of the invention.

FIG. 29 shows a perspective view of the cap shown in FIG. 28 according to an improved embodiment of the invention. Cap 5 includes improved loop 40 having internal gears 45 structured and arranged to mesh frictionally with gears 35.

Figure 30:
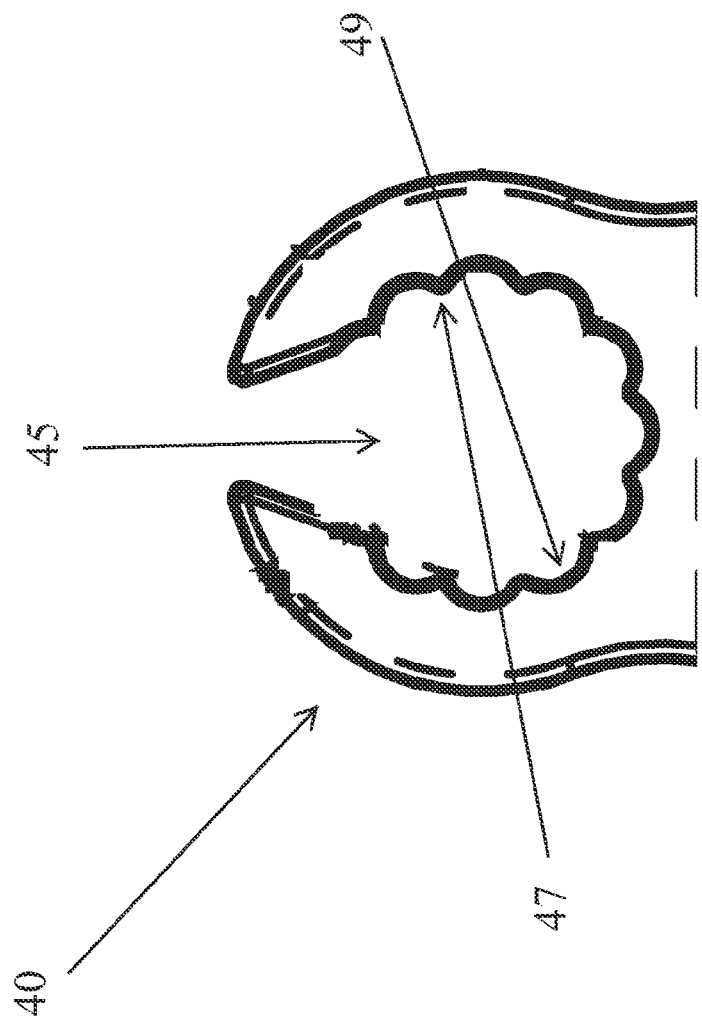
FIG. 30 shows an enlarged view of improved loop 40 as shown in FIG. 28.

FIG. 30 shows an enlarged view of improved loop 40 as shown in FIG. 28. Gears 45 preferably have concave peaks 47 and convex valleys 49 structured an arranged to frictionally and releasable engage the convex valleys 39 and concave peaks 37 of gears 35. The arcuate nature of gears 35 and 55 will allow a user to easily manipulate the base portion 1 into a desired locked angle with respect to the cap 5 without applying a force that will overly stress the gears. The peaks and valleys of respective gears 35 and 55 will slide past each other during angular movement of base portion 1 and cap 5 while remaining in a fixed position secured by the friction between the surfaces of the respective peaks and valleys.

Figure 31:
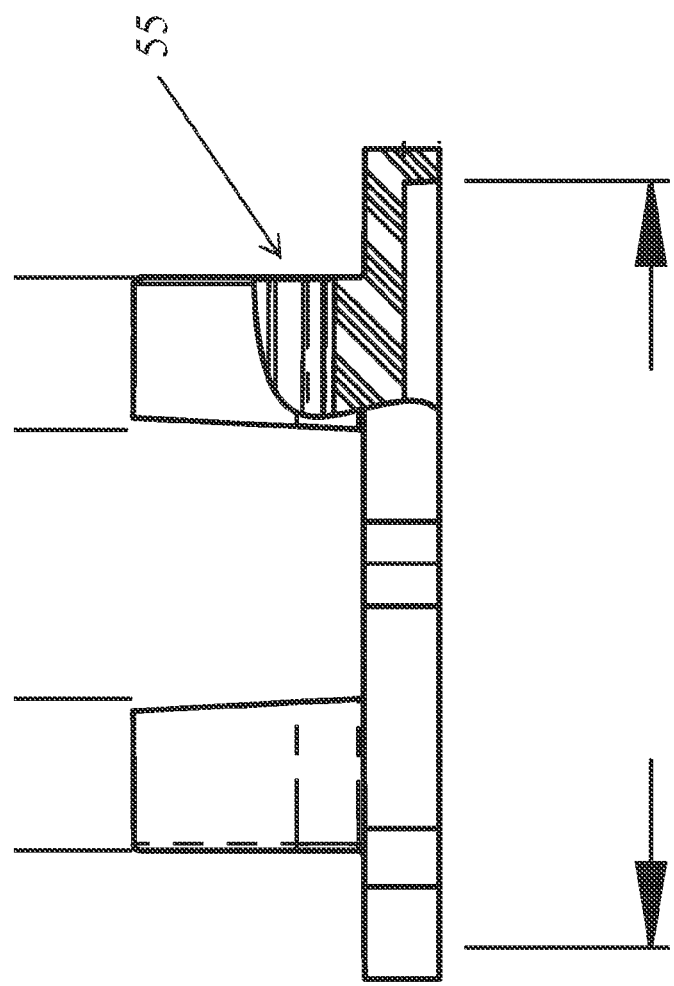
FIG. 31 shows a side and partial cut away view of the cap shown in FIG. 28 exposing the internal features the gears 55 of according to an improved embodiment of the invention.

FIG. 31 shows a side and partial cut away view of the cap shown in FIG. 28 exposing the internal features the gears 55 of according to an improved embodiment of the invention.

Figure 32:
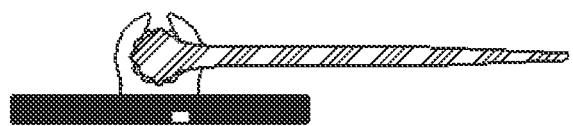
FIG. 32 shows a side view of the apparatus with the base portion 1 engaged with the cap fully rotated to a parallel position respectively.

FIG. 32 shows a side view of the apparatus with the base portion 1 engaged with the cap 5 fully rotated to a parallel position respectively.

It will be apparent to one of skill in the art that described herein is a novel universal portable device stand and holder apparatus. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. An apparatus for supporting a portable device, the apparatus comprising, an elongated base portion having a wedge end and a pivot end, the pivot end having a first set of convex peaks in an alternating series with a first set of concave valleys;

a mounting portion structured and arranged to releasably engage the portable device, the mounting portion includes at least one loop portion including a second set of convex peaks in an alternating series with a second set of concave valleys;

the loop portion of the mounting portion pivotally connected to the pivot end of the base portion where the first set of convex peaks and valleys engage the second set of convex peaks and valleys such that the mounting portion are releaseably lockable with respect to the base portion;

the base portion having a thickness and width that gradually decreases from the pivot end towards the wedge end;

the base portion having a plurality of flexible ridges disposed on each side of the base portion located substantially proximal to the wedge end and being substantially parallel to the pivot end, the plurality of flexible ridges extending substantially across the entire cross sectional surface of each side of the base portion and each of said ridges including a first elevated surface angled towards the wedge end and a second elevated surface angled towards the pivot end, where the first and said elevated surfaces are structured and arranged for frictionally engaging an orifice of a support structure in order to support the device and an engaged portable device in a cantilevered position; and wherein the elongated base portion is adapted to support the portable device on a support surface in an upright position.

2. The apparatus according to claim 1 where the pivot end is substantially cylindrical having an axis substantially parallel to a plane in which the wedge end lies.

3. The apparatus according to claim 1 where the mounting portion include a pair of loop portions having internal open ended gears structured and arranged to frictionally and releaseably engage the pivot end of the base portion.

4. The apparatus according to claim 1, the base portion having a tapered shape such that the pivot end has a larger width than the wedge end.

5. The apparatus according to claim 4, the base portion having wedge shape such that the pivot end has a larger depth than the wedge end.

6. The apparatus according to claim 1, the mounting portion including a magnetic portion for engaging the portable device.

* * * * *